United States Patent
Barac et al.

(10) Patent No.: US 12,477,405 B2
(45) Date of Patent: Nov. 18, 2025

(54) N2 ASPECTS OF INTEGRATED ACCESS AND WIRELESS ACCESS BACKHAUL NODE INTER-DONOR MIGRATION

(71) Applicant: Telefonaktiebolaget LM Ericsson (PUBL), Stockholm (SE)

(72) Inventors: Filip Barac, Huddinge (SE); Oumer Teyeb, Montréal (CA); Gunnar Mildh, Sollentuna (SE); Paul Schliwa-Bertling, Ljungsbro (SE); Ajmal Muhammad, Sollentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 374 days.

(21) Appl. No.: 18/007,209

(22) PCT Filed: Jul. 2, 2021

(86) PCT No.: PCT/SE2021/050670
§ 371 (c)(1),
(2) Date: Jan. 27, 2023

(87) PCT Pub. No.: WO2022/025809
PCT Pub. Date: Feb. 3, 2022

(65) Prior Publication Data
US 2023/0292184 A1    Sep. 14, 2023

Related U.S. Application Data

(60) Provisional application No. 63/059,494, filed on Jul. 31, 2020.

(51) Int. Cl.
H04W 36/00    (2009.01)
H04W 36/32    (2009.01)

(52) U.S. Cl.
CPC ....... *H04W 36/0009* (2018.08); *H04W 36/32* (2013.01)

(58) Field of Classification Search
CPC ......... H04W 36/0009; H04W 36/0033; H04W 36/0016; H04W 36/0066; H04W 36/08;
(Continued)

(56) References Cited

U.S. PATENT DOCUMENTS 11,716,667 B2 * 8/2023 Zong ................. H04W 8/24
370/331
2019/0075497 A1 * 3/2019 Zhu .................. H04W 36/08
(Continued)

FOREIGN PATENT DOCUMENTS

WO    2019 246446 A1    12/2019

OTHER PUBLICATIONS

3GPP TS 36.413 V16.2.0; 3rd Generation Partnership Project; Technical Specification Group Radio Access Network; Evolved Universal Terrestrial Radio Access Network (E-UTRAN); S1 Application Protocol (S1AP) (Release 16)—Jul. 2020.
(Continued)

*Primary Examiner* — Mohamed A Kamara
(74) *Attorney, Agent, or Firm* — Baker Botts L.L.P.

(57) ABSTRACT

A method is performed by a source Central Unit (CU) in an Integrated Access and Wireless Access Backhaul (IAB) network. The method includes transmitting, by the source CU, a message requesting a handover of a plurality of migrating devices associated with a first IAB node migrating from the source CU to a target CU. The message comprises at least one globally unique identifier of at least one management function serving the plurality of migrating devices.

19 Claims, 24 Drawing Sheets

(58) Field of Classification Search
CPC ..... H04W 36/13; H04W 36/14; H04W 36/22; H04W 36/32; H04W 92/20; H04W 48/18; H04W 76/11; H04W 76/16; H04W 76/18; H04W 76/27; H04W 88/08
See application file for complete search history.

(56) References Cited

U.S. PATENT DOCUMENTS

| | | | | |
|---|---|---|---|---|
| 2021/0360439 | A1* | 11/2021 | Akl | H04W 76/10 |
| 2021/0378035 | A1* | 12/2021 | Zhu | H04W 36/0019 |
| 2022/0182905 | A1* | 6/2022 | Xu | H04W 36/302 |

OTHER PUBLICATIONS

3GPP TS 36.423 V16.2.0; 3rd Generation Partnership Project; Technical Specification Group Radio Access Network; Evolved Universal Terrestrial Radio Access Network (E-UTRAN); X2 application protocol (X2AP) (Release 16)—Jul. 2020.
3GPP TS 38.401 V16.2.0; 3rd Generation Partnership Project; Technical Specification Group Radio Access Network; NG-RAN; Architecture description (Release 16)—Jul. 2020.
3GPP TS 38.413 V16.2.0; 3rd Generation Partnership Project; Technical Specification Group Radio Access Network; NG-RAN; NG Application Protocol (NGAP) (Release 16)—Jul. 2020.
3GPP TS 38.423 V16.2.0; 3rd Generation Partnership Project; Technical Specification Group Radio Access Network; NG-RAN; Xn application protocol (XnAP) (Release 16)—Jul. 2020.
3GPP TSG-RAN WG3 Meeting #102; Spokane, WA; Source: Qualcomm Inc., Nokia, Samsung; Title: IAB inter-CU Topology Adaptation for Arch 1a (R3-186456)—Nov. 12-16, 2018.
3GPP TSG-RAN WG3 Meeting #108-e; Online; Source: Ericsson; Title: [TP for NR-IAB BL CR for TS 38.423]: Corrections to BL CR (R3-203816)—Jun. 1-11, 2020.
3GPP TSG RAN Meeting #82; Sorrento, Italy; Source: Qualcomm; Title: New WID: Integrated Access and Backhaul for NR (RP-182882)—Dec. 10-13, 2018.
PCT International Search Report issued for International application No. PCT/SE2021/050670—Nov. 29, 2021.
PCT Written Opinion of the International Searching Authority issued for International application No. PCT/SE2021/050670—Nov. 29, 2021.

* cited by examiner

N2 ASPECTS OF INTEGRATED ACCESS AND WIRELESS ACCESS BACKHAUL NODE INTER-DONOR MIGRATION

PRIORITY

This nonprovisional application is a U.S. National Stage Filing under 35 U.S.C. § 371 of International Patent Application Serial No. PCT/SE2021/050670 filed Jul. 2, 2021 and entitled "N2 ASPECTS OF INTEGRATED ACCESS AND WIRELESS ACCESS BACKHAUL NODE INTER-DONOR MIGRATION" which claims priority to U.S. Provisional Patent Application No. 63/059,494 filed Jul. 31, 2020 both of which are hereby incorporated by reference in their entirety.

TECHNICAL FIELD

The present disclosure relates, in general, to wireless communications and, more particularly, to N2 aspects of Integrated Access and Wireless Backhaul (IAB) node inter-donor migration.

BACKGROUND

Third Generation Partnership Project (3GPP) is currently standardizing integrated access and wireless access backhaul (IAB) in New Radio (NR) in Release-16 (Release 16). The usage of short range mmWave spectrum in NR creates a need for densified deployment with multi-hop backhauling. However, optical fiber to every base station will be too costly and sometimes not even possible (e.g. historical sites). The main IAB principle is the use of wireless links for the backhaul (instead of fiber) to enable flexible and very dense deployment of cells without the need for densifying the transport network. Use case scenarios for IAB can include coverage extension, deployment of massive number of small cells and fixed wireless access (FWA) (e.g. to residential/office buildings). The larger bandwidth available for NR in mmWave spectrum provides opportunity for self-backhauling, without limiting the spectrum to be used for the access links. On top of that, the inherent multi-beam and Multiple Input-Multiple Output (MIMO) support in NR reduce cross-link interference between backhaul and access links allowing higher densification.

The IAB architecture, which is discussed in 3GPP TR 38.874, leverages the Central Unit (CU)/Distributed Unit (DU) split architecture of NR, where the IAB node hosts a DU part that is controlled by the CU. The IAB nodes also have a Mobile Termination (MT) part that they use to communicate with their parent nodes.

The specifications for IAB strive to reuse existing functions and interfaces defined in NR. In particular, MT, gNodeB-Distributed Unit (gNB-DU), gNodeB-Central Unit (gNB-CU), user plane function (UPF), access and mobility management function (AMF), and session management function (SMF), as well as the corresponding interfaces NR Uu (between MT and gNB), F1, NG, X2 and N4 that are used as baseline for the IAB architecture. Modifications or enhancements to these functions and interfaces for the support of IAB will be explained in the context of the architecture discussion. Additional functionality such as multi-hop forwarding is included in the architecture discussion as it is beneficial for the understanding of IAB operation.

The MT function has been defined as a component of the IAB node. In the context of this study, MT is referred to as a function residing on an IAB-node that terminates the radio interface layers of the backhaul Uu interface toward the IAB-donor or other IAB-nodes.

FIG. 1 illustrates a high-level architectural view of an IAB network. More specifically, FIG. 1 illustrates a reference diagram for IAB in standalone mode, which contains one IAB-donor and multiple IAB-nodes. The IAB-donor is treated as a single logical node that comprises a set of functions such as gNB-DU, gNodeB-Central Unit-Control Plane (gNB-CU-CP), gNodeB-Central Unit-User Plane (gNB-CU-UP), and potentially other functions. In a deployment, the IAB-donor can be split according to these functions, which can all be either collocated or non-collocated as allowed by 3GPP Next Generation-Radio Access Network (NG-RAN) architecture. IAB-related aspects may arise when such split is exercised. Also, some of the functions presently associated with the IAB-donor may eventually be moved outside of the donor in case it becomes evident that they do not perform IAB-specific tasks.

FIG. 2 illustrates the baseline user plane protocol stack for IAB. FIG. 3 illustrates the baseline control plane protocol stack for IAB. As illustrated in FIGS. 2 and 3, the chosen protocol stacks reuse the CU-DU split specification in Release 15, where the full user plane F1-U (General Packet Radio Service Tunneling Protocol-User Plane (GTP-U)/ User Datagram Protocol (UDP)/Internet Protocol (IP)) is terminated at the IAB node (like a normal DU) and the full control plane F1-C (F1-Application Protocol (F1-AP)/ Stream Control Transmission Protocol (SCTP)/IP) is also terminated at the IAB node (like a normal DU). In the above cases, Network Domain Security (NDS) has been employed to protect both UP and CP traffic (Internet Protocol Security (IPsec) in the case of UP, and Datagram Transport Layer Security (DTLS) in the case of CP). IPsec could also be used for the CP protection instead of DTLS, and in this case no DTLS layer would be used.

A new protocol layer called Backhaul Adaptation Protocol (BAP) has been introduced in the IAB nodes and the IAB donor, which is used for routing of packets to the appropriate downstream/upstream node and also mapping the UE bearer data to the proper backhaul radio link control (RLC) channel (and also between ingress and egress backhaul RLC channels in intermediate IAB nodes) to satisfy the end to end Quality of Service (QoS) requirements of bearers.

On the IAB-node, the BAP sublayer contains one BAP entity at the MT function and a separate collocated BAP entity at the DU function. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the backhaul link.

FIG. 4 shows an example of the functional view of the BAP sublayer. Though FIG. 4 is based on the radio interface protocol architecture defined in 3GPP TS 38.300 V16.2.0, the example architecture should not restrict implementation. In the example of FIG. 4, the receiving part on the BAP entity delivers BAP protocol data units (PDUs) to the transmitting part on the collocated BAP entity. Alternatively, the receiving part may deliver BAP service data units (SDUs) to the collocated transmitting part. When passing BAP SDUs, the receiving part removes the BAP header and the transmitting part adds the BAP header with the same BAP routing identifier (ID) as carried on the BAP PDU header prior to removal. Passing BAP SDUs in this manner is therefore functionally equivalent to passing BAP PDUs, in implementation.

The BAP sublayer provides data transfer services to upper layers. The BAP sublayer expects the following services from lower layers per RLC entity: acknowledged data transfer service and unacknowledged data transfer service. A detailed description is provided in 3GPP TS 38.322.

The BAP sublayer supports the following functions: data transfer; determination of BAP destination and path for packets from upper layers; determination of egress BH RLC channels for packets routed to next hop; routing of packets to next hop; differentiating traffic to be delivered to upper layers from traffic to be delivered to egress link; and flow control feedback and polling signalling.

FIG. 5 illustrates an example of some possible IAB-node migration cases listed in the order of complexity.

For example, in Intra-CU Case (A), the IAB-node (e) along with it serving UEs is moved to a new parent node (IAB-node (b)) under the same donor-DU (1). The successful intra-donor DU migration requires establishing UE context setup for the IAB-node (e) MT in the DU of the new parent node (IAB-node (b)), updating routing tables of IAB nodes along the path to IAB-node (e) and allocating resources on the new path. The IP address for IAB-node (e) will not change, while the F1-U tunnel/connection between donor-CU (1) and IAB-node (e) DU will be redirected through IAB-node (b).

As another example, in Intra-CU Case (B), the procedural requirements/complexity of this case is the same as that of Case (A). Also, since the new IAB-donor DU (i.e. DU2) is connected to the same L2 network, the IAB-node (e) can use the same IP address under the new donor DU. However, the new donor DU (i.e. DU2) will need to inform the network using IAB-node (e) L2 address in order to get/keep the same IP address for IAB-node (e) by employing some mechanism such as Address Resolution Protocol (ARP).

Intra-CU Case (C) is more complex than Case (A), as it also needs allocation of new IP address for IAB-node (e). In case, IPsec is used for securing the F1-U tunnel/connection between the Donor-CU (1) and IAB-node (e) DU, then it might be possible to use existing IP address along the path segment between the Donor-CU (1) and SeGW, and new IP address for the IPsec tunnel between SeGW and IAB-node (e) DU.

As another example, Inter-CU Case (D) is the most complicated case in terms of procedural requirements and may needs new specification procedures (such as enhancement of RRC, F1AP, XnAP, Ng signaling) that are beyond the scope of 3GPP Rel-16.

It may be noted that 3GPP Rel-16 has standardized procedure only for intra-CU migration. Specifically, during the intra-CU topology adaptation, both the source and the target parent node are served by the same IAB-donor-CU. The target parent node may use a different IAB-donor-DU than the source parent node. The source path may further have common nodes with the target path.

FIG. 6 illustrates an example IAB intra-CU topology adaptation procedure, where the target parent node uses a different IAB-donor-DU than the source parent node. Specifically, the illustrated intra-CU topology adaptation procedure includes:

1. The migrating IAB-MT sends a Measurement Report message to the source parent node gNB-DU. The report is based on a Measurement Configuration the migrating IAB-MT received from the IAB-donor-CU before.
2. The source parent node gNB-DU sends an UL RRC MESSAGE TRANSFER message to the IAB-donor-CU to convey the received Measurement Report.
3. The IAB-donor-CU sends a UE CONTEXT SETUP REQUEST message to the target parent node gNB-DU to create the UE context for the migrating IAB-MT and setup one or more bearers. These bearers are used by the migrating IAB-MT for its own data and signaling traffic.
4. The target parent node gNB-DU responds to the IAB-donor-CU with a UE CONTEXT SETUP RESPONSE message.
5. The IAB-donor-CU sends a UE CONTEXT MODIFICATION REQUEST message to the source parent node gNB-DU, which includes a generated RRCReconfiguration message. The Transmission Action Indicator in the UE CONTEXT MODIFICATION REQUEST message indicates to stop the data transmission to the migrating IAB-node.
6. The source parent node gNB-DU forwards the received RRCReconfiguration message to the migrating IAB-MT.
7. The source parent node gNB-DU responds to the IAB-donor-CU with the UE CONTEXT MODIFICATION RESPONSE message.
8. A Random Access (RA) procedure is performed at the target parent node gNB-DU.
9. The migrating IAB-MT responds to the target parent node gNB-DU with an RRCReconfigurationComplete message.
10. The target parent node gNB-DU sends an UL RRC MESSAGE TRANSFER message to the IAB-donor-CU to convey the received RRCReconfigurationComplete message. Also, uplink packets can be sent from the migrating IAB-MT, which are forwarded to the IAB-donor-CU through the target parent node gNB-DU. These downlink (DL) and uplink (UL) packets belong to the MT's own signaling and data traffic.
11. The IAB-donor-CU configures BH RLC channels and BAP-layer route entries on the target path between migrating IAB-node and target IAB-donor-DU. This step also includes allocation of Transport Network Layer (TNL) address(es) that is (are) routable via the target IAB-donor-DU. These configurations may be performed at an earlier stage, e.g. right after step 3. The new TNL address(es) is (are) included in the RRCReconfiguration message at step 5.
12. All F1-U tunnels and F1-C are switched to use the migrating IAB-node's new TNL address(es).
13. The IAB-donor-CU sends a UE CONTEXT RELEASE COMMAND message to the source parent node gNB-DU.
14. The source parent node gNB-DU releases the migrating IAB-MT's context and responds the IAB-donor-CU with a UE CONTEXT RELEASE COMPLETE message.
15. The IAB-donor-CU releases BH RLC channels and BAP routing entries on the source path. The migrating IAB-node may further release the TNL address(es) it used on the source path.

If the source route and target route have common nodes, the BH RLC channels and BAP routing entries of those nodes may not need to be released in Step 15.

Steps 11, 12 and 15 also have to be performed for the migrating IAB-node's descendant nodes, as follows:

The descendant nodes must also switch to new TNL addresses that are anchored in the target IAB-donor-DU. The IAB-donor-CU may send these addresses to the descendant nodes and release the old addresses via corresponding RRC signalling.

If needed, the IAB-donor-CU configures BH RLC channels, BAP-layer route entries on the target path for the descendant nodes and the BH RLC Channel mappings on the descendant nodes in the same manner as described for the migrating IAB-node in step 11.

The descendant nodes switch their F1-U and F1-C tunnels to new TNL addresses that are anchored at the new IAB-donor-DU, in the same manner as described for the migrating IAB-node in step 12.

Based on implementation, these steps can be performed after or in parallel with the handover of the migrating IAB-node. In Rel-16, in-flight packets in UL direction that were dropped during the migration procedure may not be recoverable.

In upstream direction, in-flight packets between the source parent node and the IAB-donor-CU can be delivered even after the target path is established. On-going downlink data in the source path may be discarded up to implementation. The IAB-donor-CU can determine the unsuccessfully transmitted downlink data over the backhaul link by implementation.

NG handover mechanisms are discussed in the current specifications. For example, the purpose of the Handover Preparation procedure is to request the preparation of resources at the target side via the 5GC. There is only one Handover Preparation procedure ongoing at the same time for a certain UE.

According to 3GPP TS 38.413 V16.2.0, the source NG-RAN node initiates the handover preparation by sending the HANDOVER REQUIRED message to the serving AMF. When the source NG-RAN node sends the HANDOVER REQUIRED message, it shall start the timer $TNG_{RELOCprep}$. The source NG-RAN node shall indicate the appropriate cause value for the handover in the Cause IE.

Upon reception of the HANDOVER REQUIRED message the AMF shall, for each PDU session indicated in the PDU Session ID IE, transparently transfer the Handover Required Transfer IE to the SMF associated with the concerned PDU session.

In case of intra-system handover, the information in the Source to Target Transparent Container IE shall be encoded according to the definition of the Source NG-RAN node to Target NG-RAN node Transparent Container IE.

If the DL Forwarding IE is included for a given QoS flow in the PDU Session Resource Information Item IE within the Source NG-RAN node to Target NG-RAN node Transparent Container IE of the HANDOVER REQUIRED message and it is set to "DL forwarding proposed", it indicates that the source NG-RAN node proposes forwarding of downlink data for that QoS flow.

If the UL Forwarding IE is included for a given QoS flow in the PDU Session Resource Information Item IE within the Source NG-RAN Node to Target NG-RAN Node Transparent Container IE of the HANDOVER REQUIRED message and it is set to "UL forwarding proposed", it indicates that the source NG-RAN node proposes forwarding of uplink data for that QoS flow.

If the DRBs to QoS Flows Mapping List IE is included in the PDU Session Resource Information Item IE within the Source NG-RAN node to Target NG-RAN node Transparent Container IE of the HANDOVER REQUIRED message, it implicitly indicates that the source NG-RAN node proposes forwarding of downlink data for those DRBs.

If the QoS Flow Mapping Indication IE for a QoS flow is included in the Associated QoS Flow List IE within the DRBs to QoS Flows Mapping List IE within the Source NG-RAN node to Target NG-RAN node Transparent Container IE of the HANDOVER REQUIRED message, it indicates that the source NG-RAN node has mapped only the uplink or downlink of the QoS flow to the DRB.

In case of intra-system handover, if the HANDOVER COMMAND message contains the DL Forwarding UP TNL Information IE for a given DRB within the Data Forwarding Response DRB List IE in the Handover Command Transfer IE, the source NG-RAN node shall consider that the forwarding of downlink data for this DRB is accepted by the target NG-RAN node. If the HANDOVER COMMAND message contains the UL Forwarding UP TNL Information IE for a given DRB in the Data Forwarding Response DRB List IE within the Handover Command Transfer IE, it means the target NG-RAN node has requested the forwarding of uplink data for this DRB.

In case direct data forwarding is applied for inter-system handover, if the Data Forwarding Response E-RAB List IE in the Handover Command Transfer IE is included in the HANDOVER COMMAND message, the source NG-RAN node shall consider that forwarding of downlink data for this E-RAB is accepted by the target eNB.

If the HANDOVER COMMAND message contains the UL Forwarding UP TNL Information IE for a given PDU session within the Handover Command Transfer IE, the source NG-RAN node shall consider that the forwarding of uplink data of the QoS flows is accepted by the target NG-RAN node.

In case of inter-system handover to LTE, the information in the Source to Target Transparent Container IE shall be encoded according to the Source eNB to Target eNB Transparent Container IE definition as specified in TS 36.413 [16].

If the Direct Forwarding Path Availability IE is included in the HANDOVER REQUIRED message the AMF shall handle it as specified in TS 23.502 [10].

If the Direct Forwarding Path Availability IE is included within the Handover Required Transfer IE of the HANDOVER REQUIRED message the SMF shall handle it as specified in 3GPP TS 23.502 V16.5.0.

When the preparation, including the reservation of resources at the target side is ready, the AMF responds with the HANDOVER COMMAND message to the source NG-RAN node. In case of intra-system handover, the AMF shall include the PDU Session Resource Handover List IE in the HANDOVER COMMAND message.

Upon reception of the HANDOVER COMMAND message the source NG-RAN node shall stop the timer $TNG_{RELOCprep}$ and start the timer $TNG_{RELOCoverall}$.

If there are any PDU sessions that could not be admitted in the target, they shall be indicated in the PDU Session Resource to Release List IE.

It may be noted that, as an exception in case of inter-system handover to LTE, the AMF generates the Handover Preparation Unsuccessful Transfer IE in the PDU Session Resource to Release List IE.

If the HANDOVER COMMAND message contains the QoS Flow to be Forwarded List IE within the Handover Command Transfer IE for a given PDU session, then the source NG-RAN node should initiate data forwarding for the listed QoS flows over the forwarding tunnel specified in the DL Forwarding UP TNL Information IE as specified in 3GPP TS 38.300 V16.2.0.

If the HANDOVER COMMAND message contains the Additional DL Forwarding UP TNL Information IE within the Handover Command Transfer IE, the source NG-RAN node should initiate data forwarding of the PDU session split in different tunnel and shall use the received UP transport layer information for the forwarding QoS flows associated to it.

If the HANDOVER COMMAND message contains the Additional UL Forwarding UP TNL Information IE within the Handover Command Transfer IE, the source NG-RAN node should initiate data forwarding of the PDU session split in different tunnels using the received UP transport layer information.

If the NAS Security Parameters from NG-RAN IE is included in the HANDOVER COMMAND message the NG-RAN node shall use it as specified in 3GPP TS 33.501 V16.5.0.

If the Target to Source Transparent Container IE has been received by the AMF from the handover target then the transparent container shall be included in the HANDOVER COMMAND message.

In case of inter-system handover to LTE, the information in the Target to Source Transparent Container IE shall be encoded according to the definition of the Target eNB to Source eNB Transparent Container IE as specified in 3GPP TS 36.413 V16.2.0.

If the Index to RAT/Frequency Selection Priority IE is contained in the Source NG-RAN Node to Target NG-RAN Node Transparent Container IE, the target NG-RAN node shall store the content of the received Index to RAT/Frequency Selection Priority IE in the UE context and use it as defined in 3GPP TS 23.501 V16.5.0.

For each QoS flow which has been established in the target NG-RAN node, if the QoS Monitoring Request IE was included in the QoS Flow Level QoS Parameters IE contained in the HANDOVER REQUEST message, the target NG-RAN node shall store this information, and, if supported, perform delay measurement and QoS monitoring, as specified in 3GPP TS 23.501 V16.5.0.

The Specifications also discuss interactions with other NGAP procedures. For example, according to 3GPP TS 38.413 V16.2.0., if, after a HANDOVER REQUIRED message is sent and before the Handover Preparation procedure is terminated, the source NG-RAN node receives an AMF initiated PDU Session Management procedure on the same UE-associated signalling connection, the source NG-RAN node shall either:
1. Cancel the Handover Preparation procedure by executing the Handover Cancellation procedure with an appropriate cause value. After successful completion of the Handover Cancellation procedure, the source NG-RAN node shall continue the AMF initiated PDU Session Management procedure.
2. Terminate the AMF initiated PDU Session Management procedure by sending the appropriate response message with an appropriate cause value, e.g. "NG intra-system handover triggered" or "NG inter-system handover triggered" to the AMF and then the source NG-RAN node shall continue with the handover procedure.

If the 5GC or the target side is not able to accept any of the PDU session resources or a failure occurs during the Handover Preparation, the AMF sends the HANDOVER PREPARATION FAILURE message with an appropriate cause value to the source NG-RAN node.

According to the Interaction with Handover Cancel procedure, if there is no response from the AMF to the HANDOVER REQUIRED message before timer $TNG_{RELOCprep}$ expires in the source NG-RAN node, the source NG-RAN node should cancel the Handover Preparation procedure by initiating the Handover Cancel procedure with the appropriate value for the Cause IE. The source NG-RAN node shall ignore any HANDOVER COMMAND message or HANDOVER PREPARATION FAILURE message received after the initiation of the Handover Cancel procedure.

Abnormal Conditions may exist. For example, if the NG-RAN node receives at least one PDU Session ID included in the PDU Session Resource Handover List IE without at least one valid associated GTP tunnel address pair (in either UL or DL), then the NG-RAN node shall consider it as a logical error and act as described in subclause 10.4. A GTP tunnel address pair is considered valid if both the GTP-TEID IE and the Endpoint IP Address IE are present.

The purpose of the Handover Resource Allocation procedure is to reserve resources at the target NG-RAN node for the handover of a UE. According to 3GPP TS 38.413 V16.2.0, the AMF initiates the procedure by sending the HANDOVER REQUEST message to the target NG-RAN node. If the Masked IMEISV IE is contained in the HANDOVER REQUEST message the target NG-RAN node shall, if supported, use it to determine the characteristics of the UE for subsequent handling.

Upon receipt of the HANDOVER REQUEST message the target NG-RAN node shall
  attempt to execute the requested PDU session configuration and associated security;
  store the received UE Aggregate Maximum Bit Rate in the UE context, and use the received UE Aggregate Maximum Bit Rate for all Non-GBR QoS flows for the concerned UE as specified in 3GPP TS 23.501 V16.5.0;
  store the received Mobility Restriction List in the UE context;
  store the received UE Security Capabilities in the UE context;
  store the received Security Context in the UE context and take it into use as defined in 3GPP TS 33.501.

Upon reception of the UE History Information IE, which is included within the Source to Target Transparent Container IE of the HANDOVER REQUEST message, the target NG-RAN node shall collect the information defined as mandatory in the UE History Information IE and shall, if supported, collect the information defined as optional in the UE History Information IE, for as long as the UE stays in one of its cells, and store the collected information to be used for future handover preparations.

Upon receiving the PDU Session Resource Setup List IE contained in the HANDOVER REQUEST message, the target NG-RAN node shall behave the same as defined in the PDU Session Resource Setup procedure. The target NG-RAN node shall report to the AMF in the HANDOVER REQUEST ACKNOWLEDGE message the result for each PDU session resource requested to be setup. In particular, for each PDU session resource successfully setup, it shall include the Handover Request Acknowledge Transfer IE containing the following information:
  The list of QoS flows which have been successfully established in the QoS Flow Setup Response List IE.
  The Data Forwarding Accepted IE if the data forwarding for the QoS flow is accepted.
  The list of QoS flows which have failed to be established, if any, in the QoS Flow Failed to Setup List IE.
  The UP transport layer information to be used for the PDU session.
  The security result associated to the PDU session.

For each PDU session resource which failed to be setup, the Handover Resource Allocation Unsuccessful Transfer IE shall be included in the HANDOVER REQUEST ACKNOWLEDGE message containing a cause value that should be precise enough to enable the SMF to know the reason for the unsuccessful establishment.

Upon reception of the HANDOVER REQUEST ACKNOWLEDGE message the AMF shall, for each PDU session indicated in the PDU Session ID IE, transfer transparently the Handover Request Acknowledge Transfer IE or Handover Resource Allocation Unsuccessful Transfer IE to the SMF associated with the concerned PDU session.

If the HANDOVER REQUEST message contains the Data Forwarding Not Possible IE associated with a given PDU session within the Handover Request Transfer IE set to "data forwarding not possible", the target NG-RAN node may not include the DL Forwarding UP TNL Information IE and for intra-system handover the Data Forwarding Response DRB List IE within the Handover Request Acknowledge Transfer IE in the HANDOVER REQUEST ACKNOWLEDGE message for that PDU session.

In case of intra-system handover, if the target NG-RAN node accepts the downlink data forwarding for at least one QoS flow for which the DL Forwarding IE is set to "DL forwarding proposed", it may include the DL Forwarding UP TNL Information IE in the Handover Request Acknowledge Transfer IE as forwarding tunnel for the QoS flows listed in the QoS Flow Setup Response List IE of the HANDOVER REQUEST ACKNOWLEDGE message.

In case of intra-system handover, if the target NG-RAN node accepts the uplink data forwarding for at least one QoS flow for which the UL Forwarding IE is set to "UL forwarding proposed", it may include the UL Forwarding UP TNL Information IE in the Handover Request Acknowledge Transfer IE for the PDU session within the PDU Session Resource Admitted List IE of the HANDOVER REQUEST ACKNOWLEDGE message.

In case of intra-system handover, for each PDU session for which the Additional DL UP TNL Information for HO List IE is included in the Handover Request Acknowledge Transfer IE of the HANDOVER REQUEST ACKNOWLEDGE message, the SMF shall consider the included Additional DL NG-U UP TNL Information IE as the downlink termination point for the associated flows indicated in the Additional QoS Flow Setup Response List IE for this PDU session split in different tunnels and shall consider the Additional DL Forwarding UP TNL Information IE, if included, as the forwarding tunnel associated to these QoS flows.

In case of intra-system handover, for each PDU session for which the Additional UL Forwarding UP TNL Information IE is included in the Handover Request Acknowledge Transfer IE of the HANDOVER REQUEST ACKNOWLEDGE message, the SMF shall consider it as the termination points for the uplink forwarding tunnels for this PDU session split in different tunnels.

In case of intra-system handover, if the target NG-RAN node accepts the data forwarding for a successfully configured DRB, the target NG-RAN node may include the DL Forwarding UP TNL Information IE for the DRB within the Data Forwarding Response DRB List IE within Handover Request Acknowledge Transfer IE of the HANDOVER REQUEST ACKNOWLEDGE message.

If the HANDOVER REQUEST ACKNOWLEDGE message contains the UL Forwarding UP TNL Information IE for a given DRB in the Data Forwarding Response DRB List IE within the Handover Request Acknowledge Transfer IE, it indicates the target NG-RAN node has requested the forwarding of uplink data for the DRB.

In case of inter-system handover from E-UTRAN, if the PDU Session Resource Setup Request Transfer IE contains the Direct Forwarding Path Availability IE set to "direct path available", the target NG-RAN node shall, if supported, and if it accepts downlink data forwarding for the QoS flows mapped to an E-RAB of an admitted PDU session, include the DL Forwarding UP TNL Information IE in the Data Forwarding Response E-RAB List IE in the Handover Request Acknowledge Transfer IE in the HANDOVER REQUEST ACKNOWLEDGE message for that mapped E-RAB.

In case of inter-system handover from E-UTRAN, the target NG-RAN node includes the Data Forwarding Accepted IE for each QoS flow that the DL Forwarding IE is set to "DL forwarding proposed" for the corresponding E-RAB in the Source NG-RAN Node to Target NG-RAN Node Transparent Container IE and that the target NG-RAN node has admitted the proposed forwarding of downlink data for the QoS flow. If indirect data forwarding is applied for inter-system handover, if the target NG-RAN node accepts the downlink data forwarding for at least one QoS flow of an admitted PDU session it shall include the DL Forwarding UP TNL Information IE in the PDU Session Resource Setup Response Transfer IE for that PDU session within the PDU Session Resources Admitted List IE of the HANDOVER REQUEST ACKNOWLEDGE message.

In case of inter-system handover from E-UTRAN with direct forwarding, if the target NG-RAN node receives the SgNB UE X2AP ID IE in the Source NG-RAN Node to Target NG-RAN Node Transparent Container IE, it may use it for internal forwarding as described in 3GPP TS 37.340 V16.2.0.

The target NG-RAN node shall use the information in the Mobility Restriction List IE if present in the HANDOVER REQUEST message to determine a target for subsequent mobility action for which the target NG-RAN node provides information about the target of the mobility action towards the UE;
  select a proper SCG during dual connectivity operation;
  assign proper RNA(s) for the UE when moving the UE to RRC_INACTIVE state.

If the Mobility Restriction List IE is not contained in the HANDOVER REQUEST message, the target NG-RAN node shall consider that no roaming and no access restriction apply to the UE. The target NG-RAN node shall also consider that no roaming and no access restriction apply to the UE when:

one of the QoS flows includes a particular ARP value (3GPP TS 23.501 V16.5.0).

If the Trace Activation IE is included in the HANDOVER REQUEST message the target NG-RAN node shall, if supported, initiate the requested trace function as described in 3GPP TS 32.422 V16.2.0.

If the Location Reporting Request Type IE is included in the HANDOVER REQUEST message, the target NG-RAN node should perform the requested location reporting functionality for the UE as described in subclause 8.12.

If the Core Network Assistance Information for RRC_I-NACTIVE IE is included in the HANDOVER REQUEST message, the target NG-RAN node shall, if supported, store this information in the UE context and use it for e.g. the RRC_INACTIVE state decision and RNA configuration for the UE and RAN paging if any for a UE in RRC_INACTIVE state, as specified in 3GPP TS 38.300 V16.2.0.

If the CN Assisted RAN Parameters Tuning IE is included in the HANDOVER REQUEST message, the NG-RAN node may use it as described in 3GPP TS 23.501 V16.5.0.

If the New Security Context Indicator IE is included in the HANDOVER REQUEST message, the target NG-RAN node shall use the information as specified in 3GPP TS 33.501.

If the NASC IE is included in the HANDOVER REQUEST message, the target NG-RAN node shall use it towards the UE as specified in 3GPP TS 33.501.

If the RRC Inactive Transition Report Request IE is included in the HANDOVER REQUEST message, the NG-RAN node shall, if supported, store this information in the UE context.

If the Redirection for Voice EPS Fallback IE is included in the HANDOVER REQUEST message, the NG-RAN node shall, if supported, store it and use it in a subsequent decision of EPS fallback for voice as specified in 3GPP TS 23.502 V16.5.0.

If the SRVCC Operation Possible IE is included in the HANDOVER REQUEST message, the target NG-RAN node shall, if supported, store the content of the received SRVCC Operation Possible IE in the UE context and use it as defined in 3GPP TS 23.216.

After all necessary resources for the admitted PDU session resources have been allocated, the target NG-RAN node shall generate the HANDOVER REQUEST ACKNOWLEDGE message.

According to the Interactions with RRC Inactive Transition Report procedure specified in 3GPP TS 38.413 V16.2.0, if the RRC Inactive Transition Report Request IE is included in the HANDOVER REQUEST message and set to "subsequent state transition report", the NG-RAN node shall, if supported, send the RRC_INACTIVE TRANSITION REPORT message to the AMF to report the RRC state of the UE when the UE enters or leaves RRC_INACTIVE state.

If the target NG-RAN node does not admit any of the PDU session resources, or a failure occurs during the Handover Preparation, it shall send the HANDOVER FAILURE message to the AMF with an appropriate cause value.

If the supported algorithms for encryption defined in the Encryption Algorithms IE in the UE Security Capabilities IE, plus the mandated support of EEA0 and NEA0 in all UEs (3GPP TS 33.501), do not match any allowed algorithms defined in the configured list of allowed encryption algorithms in the NG-RAN node (3GPP TS 33.501), the target NG-RAN node shall reject the procedure using the HANDOVER FAILURE message.

If the supported algorithms for integrity defined in the Integrity Protection Algorithms IE in the UE Security Capabilities IE, plus the mandated support of the EIA0 and NIA0 algorithm in all UEs (3GPP TS 33.501), do not match any allowed algorithms defined in the configured list of allowed integrity protection algorithms in the NG-RAN node (3GPP TS 33.501), the target NG-RAN node shall reject the procedure using the HANDOVER FAILURE message.

If the target NG-RAN node receives a HANDOVER REQUEST message which does not contain the Mobility Restriction List IE, and the serving PLMN cannot be determined otherwise by the NG-RAN node, the target NG-RAN node shall reject the procedure using the HANDOVER FAILURE message.

If the target NG-RAN node receives a HANDOVER REQUEST message containing the Mobility Restriction List IE, and the serving PLMN indicated is not supported by the target cell, the target NG-RAN node shall reject the procedure using the HANDOVER FAILURE message.

The purpose of the Path Switch Request procedure is to establish a UE associated signalling connection to the 5GC and, if applicable, to request the switch of the downlink termination point of the NG-U transport bearer towards a new termination point.

As discussed in 3GPP TS 38.413 V16.2.0, the NG-RAN node initiates the procedure by sending the PATH SWITCH REQUEST message to the AMF. Upon reception of the PATH SWITCH REQUEST message the AMF shall, for each PDU session indicated in the PDU Session ID IE, transparently transfer the Path Switch Request Transfer IE to the SMF associated with the concerned PDU session.

After all necessary updates including the UP path switch have been successfully completed in the 5GC for at least one of the PDU session resources included in the PATH SWITCH REQUEST, the AMF shall send the PATH SWITCH REQUEST ACKNOWLEDGE message to the NG-RAN node and the procedure ends.

The list of accepted QoS flows shall be included in the PATH SWITCH REQUEST message within the Path Switch Request Transfer IE. The SMF shall handle this information as specified in 3GPP TS 23.502 V16.5.0.

For each PDU session for which the Additional DL QoS Flow per TNL Information IE is included in the Path Switch Request Transfer IE of the PATH SWITCH REQUEST message, the SMF may use each included UP transport layer information as the downlink termination point for the included associated QoS flows for this PDU session split in different tunnels.

The list of PDU sessions which failed to be setup, if any, shall be included in the PATH SWITCH REQUEST message within the Path Switch Request Setup Failed Transfer IE. The AMF shall handle this information as specified in 3GPP TS 23.502 V16.5.0.

For each PDU session for which the User Plane Security Information IE is included in the Path Switch Request Transfer IE of the PATH SWITCH REQUEST message, the SMF shall behave as specified in 3GPP TS 33.501 and may send back the Security Indication IE within the Path Switch Request Acknowledge Transfer IE of the PATH SWITCH REQUEST ACKNOWLEDGE message.

For each PDU session for which the DL NG-U TNL Information Reused IE set to "true" is included in the Path Switch Request Transfer IE of the PATH SWITCH REQUEST message, the SMF shall, if supported, consider that the DL TNL information contained in the DL NG-U UP TNL Information IE has been reused.

If the Security Indication IE is included within the Path Switch Request Acknowledge Transfer IE of the PATH SWITCH REQUEST ACKNOWLEDGE message, the NG-RAN node shall behave as specified in 3GPP TS 33.501.

If the UL NG-U UP TNL Information IE is included within the Path Switch Request Acknowledge Transfer IE of the PATH SWITCH REQUEST ACKNOWLEDGE message, the NG-RAN node shall store this information and use it as the uplink termination point for the user plane data for this PDU session.

If the Additional NG-U UP TNL Information IE is included within the Path Switch Request Acknowledge Transfer IE of the PATH SWITCH REQUEST ACKNOWLEDGE message, the NG-RAN node shall store this information and use the included UL NG-U UP TNL Information IE(s) as the uplink termination point(s) of the user plane data for this PDU session split in different tunnel.

If the Core Network Assistance Information for RRC INACTIVE IE is included in the PATH SWITCH REQUEST ACKNOWLEDGE message, the NG-RAN node shall, if supported, store this information in the UE context and use it for e.g. the RRC_INACTIVE state decision and RNA configuration for the UE and RAN paging if any for a UE in RRC_INACTIVE state, as specified in 3GPP TS 38.300 V16.2.0.

If the CN Assisted RAN Parameters Tuning IE is included in the PATH SWITCH REQUEST ACKNOWLEDGE message, the NG-RAN node may use it as described in 3GPP TS 23.501 V16.5.0.

If the RRC Inactive Transition Report Request IE is included in the PATH SWITCH REQUEST ACKNOWLEDGE message, the NG-RAN node shall, if supported, store this information in the UE context.

If the New Security Context Indicator IE is included in the PATH SWITCH REQUEST ACKNOWLEDGE message, the NG-RAN node shall use the information as specified in 3GPP TS 33.501.

Upon reception of the PATH SWITCH REQUEST ACKNOWLEDGE message the NG-RAN node shall store the received Security Context IE in the UE context and the NG-RAN node shall use it as specified in 3GPP TS 33.501.

If the UE Security Capabilities IE is included in the PATH SWITCH REQUEST ACKNOWLEDGE message, the NG-RAN node shall handle it accordingly (3GPP TS 33.501).

If the Redirection for Voice EPS Fallback IE is included in the PATH SWITCH REQUEST ACKNOWLEDGE message, the NG-RAN node shall, if supported, store it and use it in a subsequent decision of EPS fallback for voice as specified in 3GPP TS 23.502 V16.5.0.

If the PDU Session Resource Released List IE is included in the PATH SWITCH REQUEST ACKNOWLEDGE message, the NG-RAN node shall release the corresponding QoS flows and regard the PDU session(s) indicated in the PDU Session Resource Released List IE as being released. The appropriate cause value for each PDU session released is included in the Path Switch Request Unsuccessful Transfer IE contained in the PATH SWITCH REQUEST ACKNOWLEDGE message.

If the SRVCC Operation Possible IE is included in the PATH SWITCH REQUEST ACKNOWLEDGE message, the NG-RAN node shall, if supported, store the content of the received SRVCC Operation Possible IE in the UE context and use it as defined in 3GPP TS 23.216.

According to the Interactions with RRC Inactive Transition Report procedure, if the RRC Inactive Transition Report Request IE is included in the PATH SWITCH REQUEST ACKNOWLEDGE message and set to "single RRC connected state report" and the UE is in RRC CONNECTED state, the NG-RAN node shall, if supported, send one RRC INACTIVE TRANSITION REPORT message to the AMF to report the RRC state of the UE.

If the RRC Inactive Transition Report Request IE is included in the PATH SWITCH REQUEST ACKNOWLEDGE message and set to "single RRC connected state report" and the UE is in RRC_INACTIVE state, the NG-RAN node shall, if supported, send to the AMF one RRC INACTIVE TRANSITION REPORT message plus one subsequent RRC_INACTIVE TRANSITION REPORT message when the RRC state transitions to RRC CONNECTED state.

If the RRC Inactive Transition Report Request IE is included in the PATH SWITCH REQUEST ACKNOWLEDGE message and set to "subsequent state transition report", the NG-RAN node shall, if supported, send one RRC INACTIVE TRANSITION REPORT message to the AMF to report the RRC state of the UE and subsequent RRC INACTIVE TRANSITION REPORT messages to report the RRC state of the UE when the UE enters or leaves RRC_INACTIVE state.

If the 5GC fails to switch the downlink termination point of the NG-U transport bearer towards a new termination point for all PDU session resources, the AMF shall send the PATH SWITCH REQUEST FAILURE message to the NG-RAN node.

The NG-RAN node shall release the corresponding QoS flows and regard the PDU session(s) indicated in the PDU Session Resource Released List IE included in the PATH SWITCH REQUEST FAILURE message as being released.

The appropriate cause value for each PDU session released is included in the Path Switch Request Unsuccessful Transfer IE contained in the PATH SWITCH REQUEST FAILURE message.

Abnormal Conditions may exist. For example, if the AMF receives a PATH SWITCH REQUEST message containing several PDU Session ID IEs (in the PDU Session Resource to be Switched in Downlink List IE) set to the same value, the AMF shall send the PATH SWITCH REQUEST FAILURE message to the NG-RAN node.

As an exception, the AMF generates the Path Switch Request Unsuccessful Transfer IE.

Certain problems exist. For example, as mentioned above, 3GPP Rel-16 has standardized only IAB intra-CU migration procedure. Considering that inter-CU migration will be an important feature of IAB Rel-17 WI, certain enhancements to existing UE handover and IAB inter-CU migration procedure are required for reducing service interruption (due to IAB-node migration) and signaling load. Current specifications enable only the handover of individual UEs. For example, Xn signaling for group handover of a multitude of IAB nodes and UEs has been proposed.

In addition to handover, the IAB nodes and UEs between different serving RAN nodes, the S1AP/NGAP termination point pertaining to the migrating IAB nodes and UEs connected via the migrating IAB node need to be switched from the source to the target donor nodes. Similar to the Xn handover case, current NGAP/S1AP specifications enable only the handover of individual UEs. Moreover, the (migrating) IAB-MTs/IAB-nodes as well as the UEs will be registered and served by different AMFs where different AMFs may also be serving different slices, one of the reasons for this may be load distribution. Another reason could be the desire to support specific AMFs serving IAB nodes which are different from AMFs serving UEs. This needs to be considered when performing X2/Xn and NG (i.e. N2) handover and switching the N2 UE logical connection. There is also a need to allocate user plane resources in the CU-UP and UPFs for the IAB-MTs/IAB-nodes and the UEs that are subject to the migration process from source CU to target CU.

SUMMARY

Certain aspects of the present disclosure and their embodiments may provide solutions to these or other challenges. For example, according to certain embodiments, methods, systems, and mechanisms are provided to address IAB node inter-CU migration by use of an Xn/X2 and NG (i.e., N2) handover.

According to certain embodiments, a method by a source CU in an IAB network includes transmitting a message requesting a handover of a plurality of migrating devices associated with a first IAB node migrating from the source CU to a target CU. The message includes at least one globally unique identifier of at least one management function serving the plurality of migrating devices.

According to certain embodiments, a method by a target CU in an IAB network includes receiving, from a source CU via an Xn interface, a first message requesting a handover of a plurality of migrating devices associated with a first IAB node from the source CU to the target CU. The first message includes at least one globally unique identifier of at least one management function serving the plurality of migrating devices. The target CU transmits, to each management function associated with the at least one globally unique identifier included in the first message, a second message that includes information for performing a logical connection reconfiguration for each of the plurality of migrating devices.

According to certain embodiments, a method by a network node operating as a management function in an IAB network includes receiving, from a source CU with respect to a plurality of migrating devices associated with a first IAB node, a first message. The first message includes at least one globally unique identifier of at least one application function serving the plurality of migrating devices. The network node transmits, to a target CU, a second message comprising the at least one globally unique identifier of the at least one application function serving the plurality of migrating devices.

According to certain embodiments, a source CU in an IAB network is adapted to transmit a message requesting a handover of a plurality of migrating devices associated with a first IAB node migrating from the source CU to a target CU. The message includes at least one globally unique identifier of at least one management function serving the plurality of migrating devices.

According to certain embodiments, a target CU in an IAB network is adapted to receive, from a source CU via an Xn interface, a first message requesting a handover of a plurality of migrating devices associated with a first IAB node from the source CU to the target CU. The first message includes at least one globally unique identifier of at least one management function serving the plurality of migrating devices. The target CU is adapted to transmit, to each management function associated with the at least one globally unique identifier included in the first message, a second message that includes information for performing a logical connection reconfiguration for each of the plurality of migrating devices.

According to certain embodiments, a network node operating as a management function in an IAB network is adapted to receive, from a source CU with respect to a plurality of migrating devices associated with a first IAB node, a first message. The first message includes at least one globally unique identifier of at least one application function serving the plurality of migrating devices. The network node is adapted to transmit, to a target CU, a second message comprising the at least one globally unique identifier of the at least one application function serving the plurality of migrating devices.

Certain embodiments may provide one or more of the following technical advantages. For example, one technical advantage may be that certain embodiments enable the concurrent switching of N2 connections for a multitude of migrating IAB nodes and their served UEs, thus reducing the service interruption and signaling overhead, which may occur if each UE and the IAB node is switched over in separate procedures. As another example, a technical advantage may be that certain embodiments using concurrent switching also reduce the risk that possible error cases would occur where some sub-procedure fails causing all sub-procedures to fail or stall.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
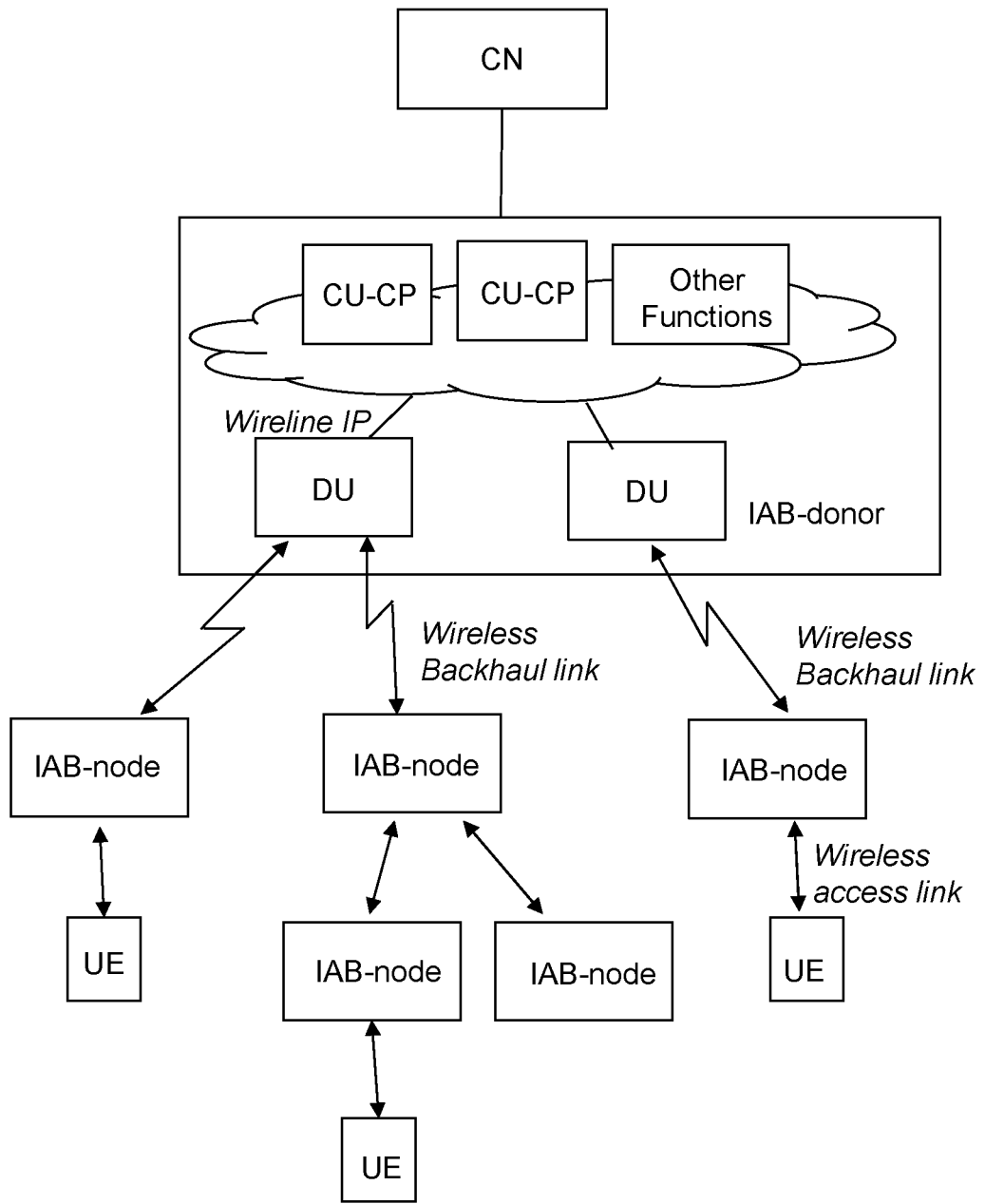
FIG. 1 illustrates a high-level architectural view of an IAB network.
Figure 2:
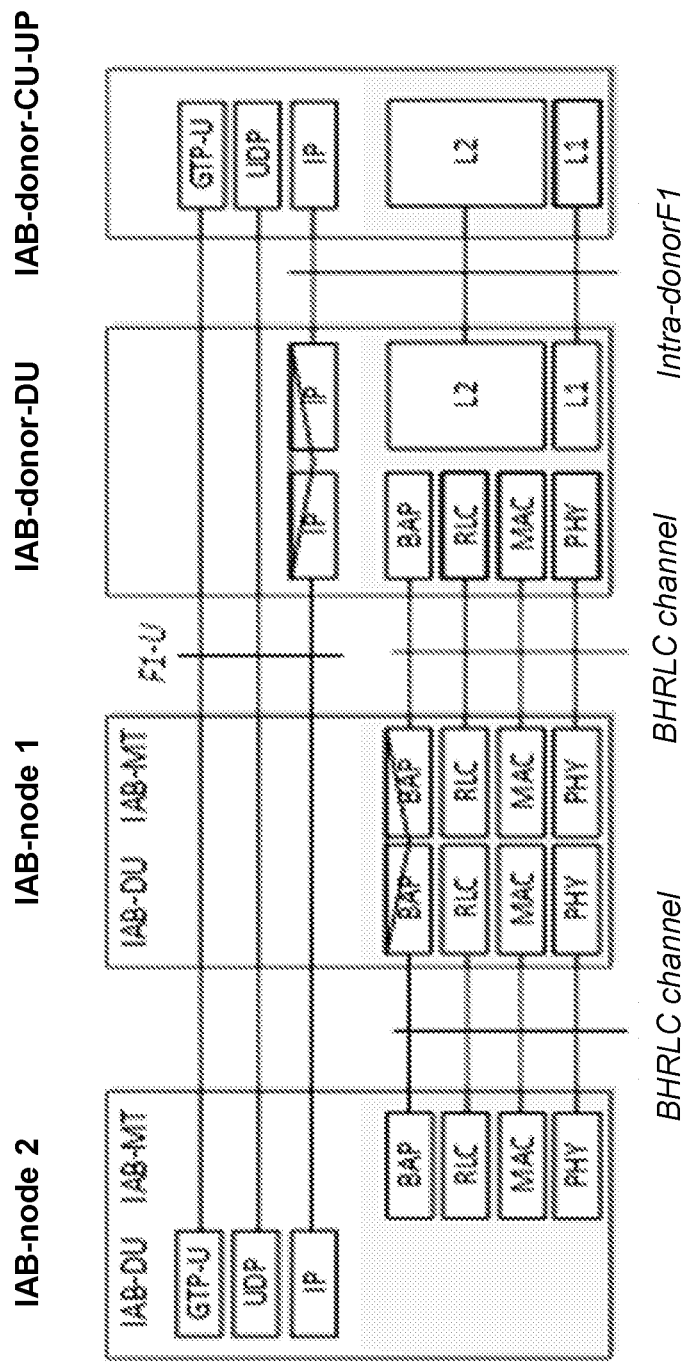
FIG. 2 illustrates the baseline user plane protocol stack for IAB.
Figure 3:
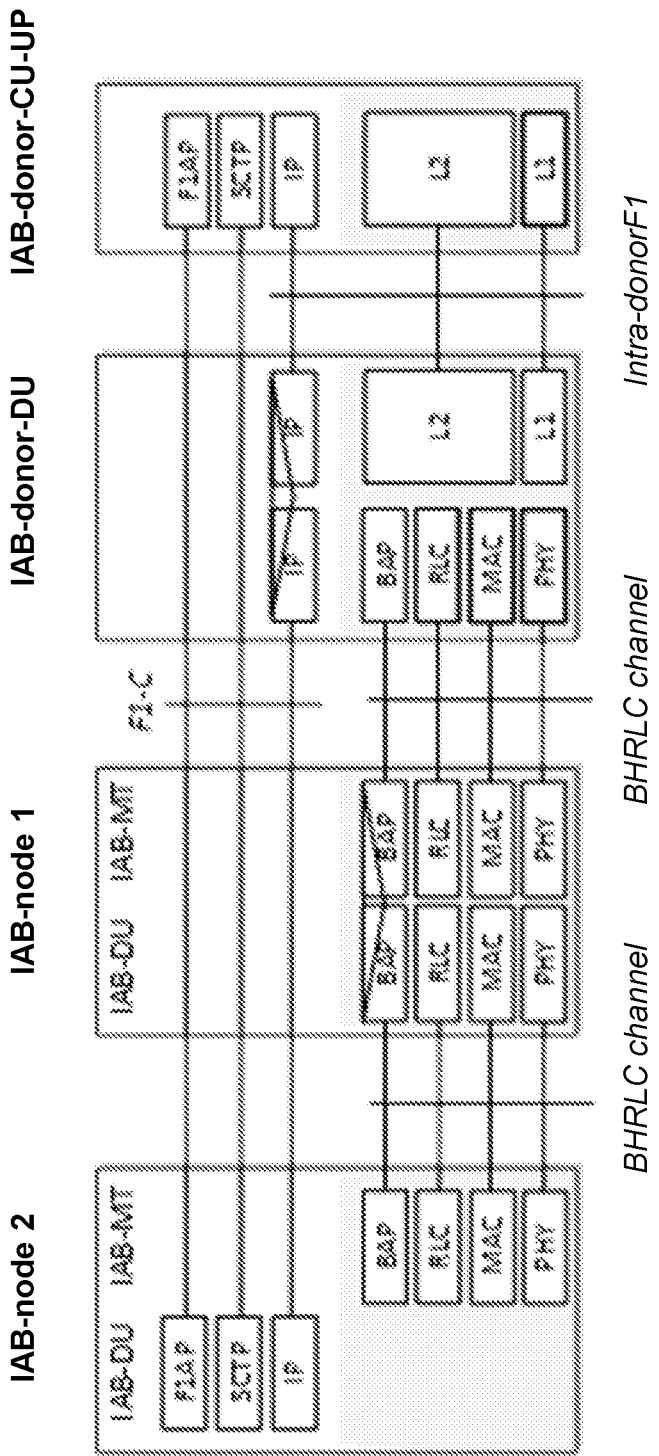
FIG. 3 illustrates the baseline control plane protocol stack for IAB.
Figure 4:
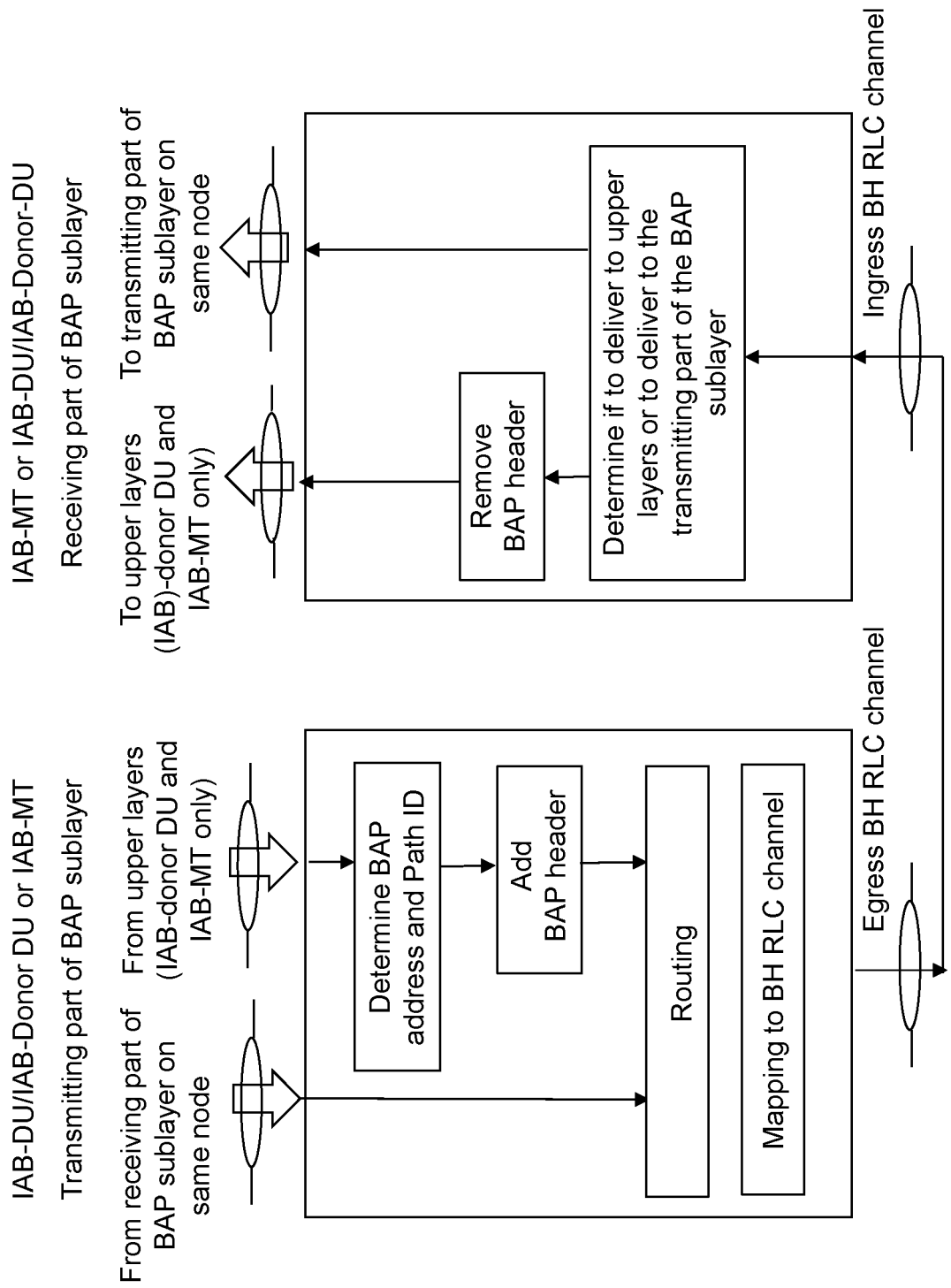
FIG. 4 illustrates an example of the functional view of the BAP sublayer.
Figure 5:
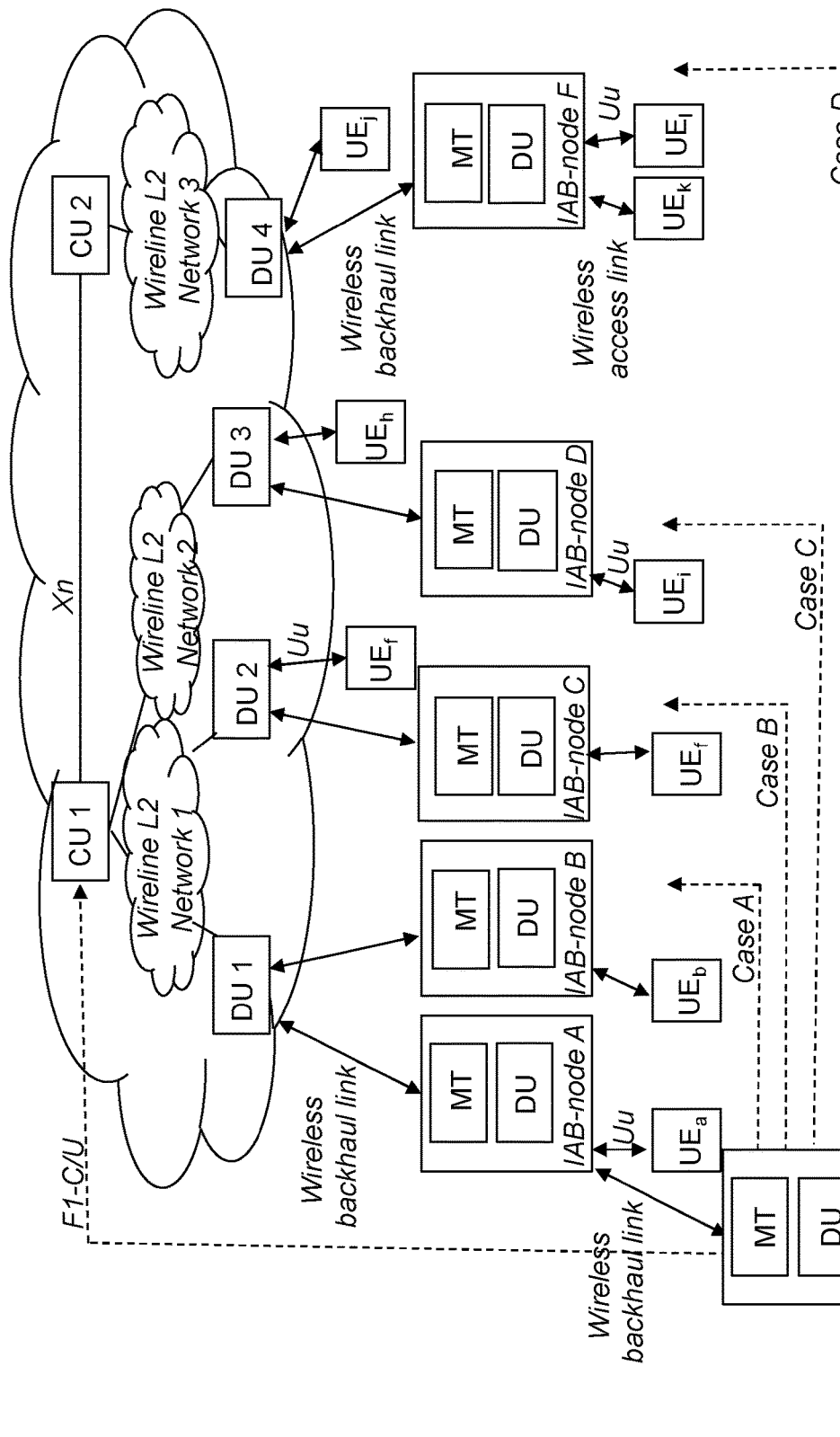
FIG. 5 illustrates an example of some possible IAB-node migration cases listed in the order of complexity.
Figure 6:
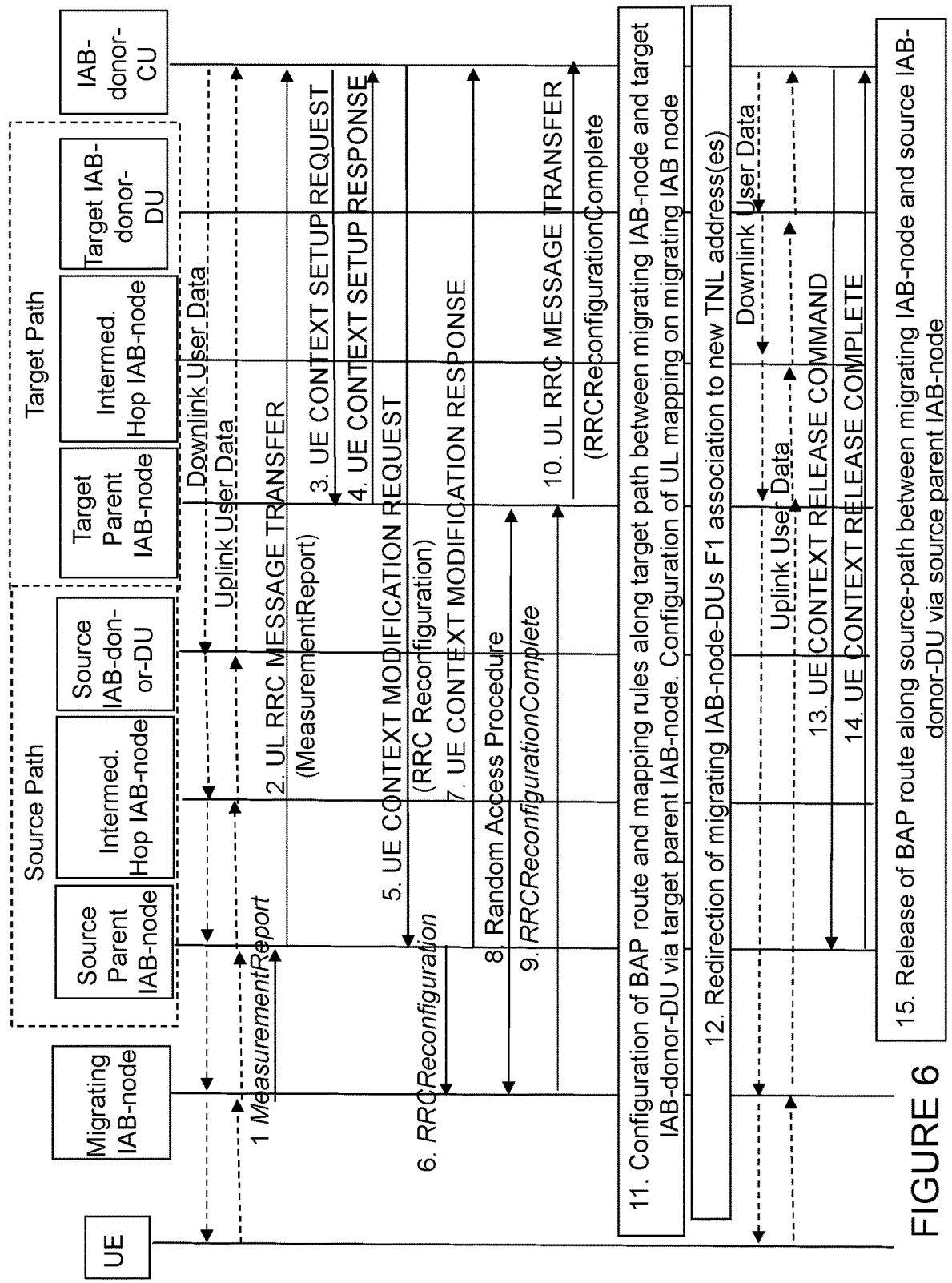
FIG. 6 illustrates an example IAB intra-CU topology adaptation procedure, where the target parent node uses a different IAB-donor-DU than the source parent node.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

The terms "N2 handover" and "NG handover" and "NGAP handover" are used interchangeably. The same holds for the term "connection".

The terms "gNB-CU" and "IAB-Donor-CU" and "CU" are used interchangeably.

The terms "old CU", and "source CU" are used interchangeably.

The terms "new CU" and "target CU" are used interchangeably.

The terms "IAB-Donor DU" and "Donor-DU" are used interchangeably.

The terms "inter-CU handover" and "inter-donor handover" are used interchangeably.

The terms "handover" and "migration" are used interchangeably.

The term "child IAB node" includes all descendants of an IAB node, i.e. not only the directly connected children, but also children's children and so on.

Figure 7:
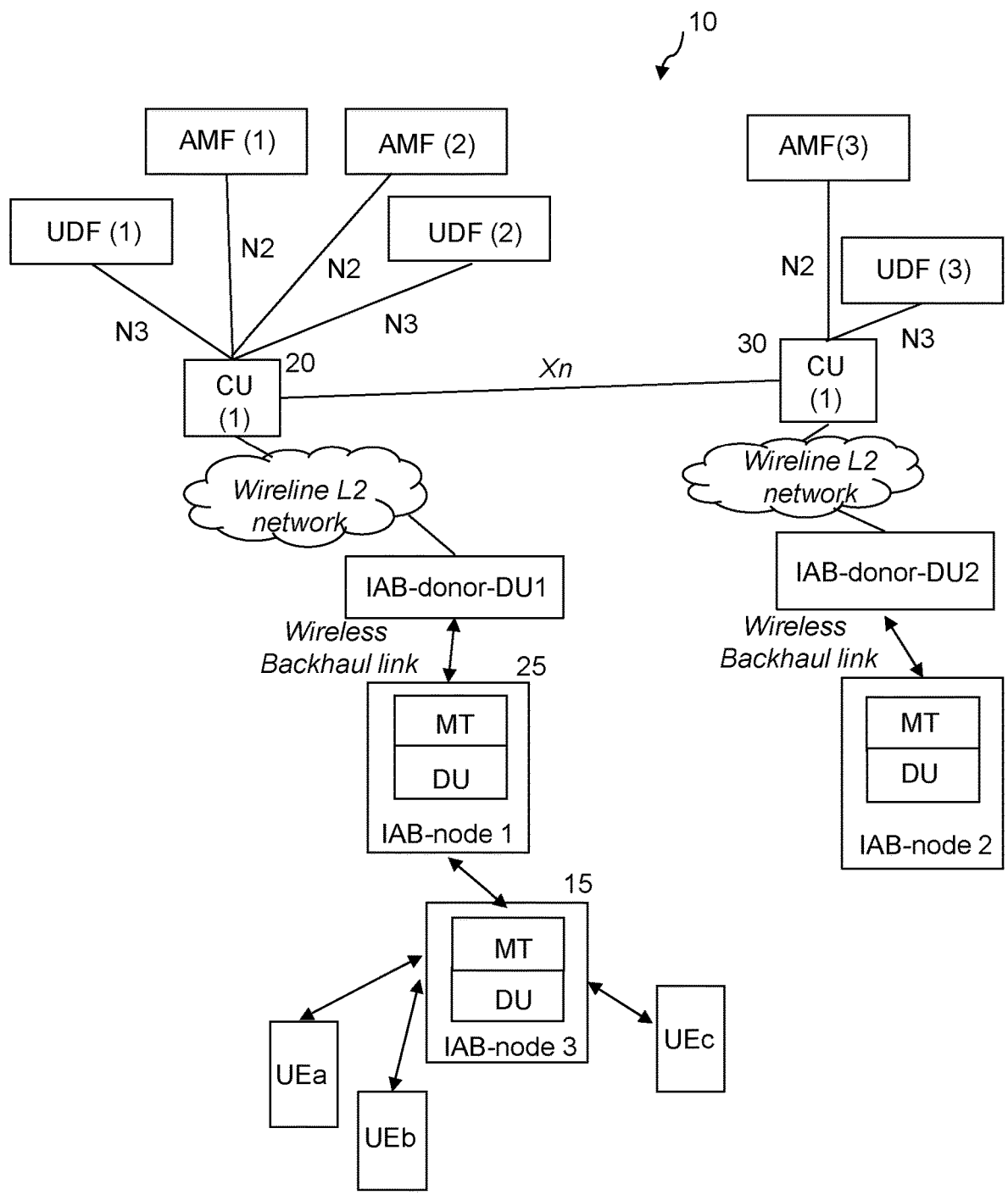
FIG. 7 illustrates an example of IAB network scenario, according to certain embodiments.

FIG. 7 illustrates an example of IAB network scenario 10, according to certain embodiments. The example topology shown in FIG. 7 is used to illustrate example embodiments of this disclosure, but should not be considered limiting.

Specifically, FIG. 7 illustrates a scenario where the DU of IAB-node-3 15 has an F1AP connection with IAB-Donor CU1 20 (i.e. CU 1), while the MT functionality of the IAB-node-3 15 (i.e., IAB-MT-3) is connected to/served by IAB-node-1 25. For simplicity, the migrating IAB node-3 15 is illustrated as having no children of its own, but the embodiments discussed below are equally applicable to situations where an IAB node has children of its own.

Certain embodiments are discussed herein as applying to NG-RAN and 5GC, where Xn and NG handovers are executed, involving NG-RAN nodes and AMFs. However, the techniques disclosed herein are equally applicable to E-UTRAN nodes and EPC, where X2 and S1 handovers are executed, involving E-UTRAN nodes and MMEs. The MMEs are identified by GUMMEIs.

According to certain embodiments, a method includes the following steps performed by a source CU:

The source CU 20 verifies that all serving AMFs (for the UEs and IAB nodes) have connectivity to the target CU 30, which enables the possibility to perform the migration process by means of Xn handover.

For the Xn handover, the source CU 20 includes in the Xn HANDOVER REQUEST the identities—GUAMI(s)—of the AMF(s) serving IAB-MTs/IAB-nodes and UEs served by the cells configured on the IAB-nodes. The legacy Xn HANDOVER REQUEST message provides the GUAMI for a single UE. According to certain embodiments provided herein, however, the GUAMIs are provided for all the migrating IAB nodes and UEs, in a single message, per IAB-MT and UE. In particular embodiments, this can be a modified XN handover request message or a newly defined message.

According to certain embodiments, the information included in the Xn HANDOVER REQUEST provides indication whether the entity that is subject to handover is an IAB-MT/IAB-node or a UE. In current specifications, the Xn HANDOVER REQUEST contains IAB node indication, where the Xn handover procedure is executed today for a single UE at a time. According to certain embodiments provided herein, this information is provided for all the migrating IAB nodes and UEs, in a single message, per IAB-MT and UE.

According to certain embodiments, the target CU 30 can decide to not reconfigure the radio interface of the UEs that are subject to handover as well as not to reconfigure the radio interface to the IAB-MTs/IAB-nodes that are below the top-level IAB-MT/IAB-node that is changing its donor. In other words, the source CU 20 indicates which IAB-MT/IAB-node's radio interface must be reconfigured.

In a particular and possibly preferred embodiment, the only IAB-MT whose air interface should be reconfigured may be the IAB-MT of the IAB node that directly and indirectly serves all the other migrating IAB nodes and UEs, but it is also possible that the air interface of the other migrating IAB nodes and/or UEs may be modified.

The source CU includes in the Xn HANDOVER REQUEST message the F1AP UE Context information of all IAB-MT(s)/IAB-node(s) and the UEs served by the cells configured on the IAB-nodes.

According to certain embodiments, a method includes the following steps performed by a target CU 30:

At Xn Handover, subsequent to successful handover execution, the target CU:
  i. Sends PATH SWITCH REQUEST messages to the AMFs serving IAB-MTs/IAB-nodes and UEs served by the cells configured on the IAB-nodes. In these messages, the AMFs are identified by their GUAMI(s), received in the relevant HANDOVER REQUEST message.
    1. In a particular embodiment, to reduce the signaling load on the N2 interface, the PATH SWITCH REQUEST message can be enhanced to carry information pertaining to all IAB-MTs/IAB-nodes and UEs served by the AMF that is addressed by that PATH SWITCH REQUEST message which UE-associated logical NG-connection over the NG interface are to be switched from source CU 20 to target CU 30. Alternatively, in a particular embodiment, a new NGAP message to carry information pertaining to all IAB-MTs/IAB-nodes and/or UEs served by the AMF which UE-associated logical NG-connection over the NG interface are to be switched from source CU to target CU.
  ii. In a particular embodiment, the AMFs update the PDU Sessions in the respective SMFs. This can be performed on a per-UE and per-IAB-MT basis in a sequential manner.
    1. Alternatively, in a particular embodiment, this can be done in a group manner, i.e. using messages that carry information pertaining to all UEs and/or IAB-MTs served by the SMF addressed with the update message. This can be done via an enhanced existing message or by using a newly defined message for group update.
  iii. AMFs reply to target CU 30 with a PATH SWITCH REQUEST ACKNOWLEDGE messages. This can be performed on a per-UE and/or per-IAB-MT basis in a sequential manner (i.e. as in legacy).
    1. Alternatively, to reduce the signaling load on the N2 interface, the PATH SWITCH REQUEST ACKNOWLEDGE message can be enhanced to carry information pertaining to all IAB-MTs/IAB-nodes and UEs served by the AMF that is addressed by that PATH SWITCH REQUEST message which UE-associated logical NG-connection over the NG interface are to be switched from source CU to target CU. Alternatively, a new NGAP message to carry information pertaining to all IAB-MTs/IAB-nodes and UEs served by the AMF which UE-associated logical NG-connection over the NG interface are to be switched from source CU to target CU.

At N2 handover, the source CU 20 sends N2 HANDOVER REQUIRED message that includes indication whether the entity that is subject to handover is an IAB-MT/IAB-node or a UE. The target CU 30 can decide to not reconfigure the radio interface of the UEs that are subject to handover as well as not to reconfigure the radio interface to the IAB-MTs/IAB-nodes that are below the IAB-MT/IAB-node that is changing its donor, i.e. the source CU 20 indicates which IAB-MT/IAB-node's radio interface must be reconfigured. The source CU 20 includes in the N2 HANDOVER REQUIRED message the F1AP UE Context information of all IAB-MT(s)/IAB-node(s) and the UEs served by the cells configured on the IAB-nodes.

At N2 handover without AMF change, the source CU 20 sends a N2 HANDOVER REQUIRED message to the AMF serving the IAB-MT/IAB-node that is changing the donor. According to certain embodiments, this enhanced N2 HANDOVER REQUIRED message includes, additionally to what is mentioned above, the identities of the AMFs serving IAB-MTs/IAB-nodes and UEs served by the cells configured on the IAB-nodes. Alternatively, a new NGAP (i.e. N2) message can be defined for this purpose. This information set is forwarded by the AMF to the target CU in the NGAP HANDOVER REQUEST message.

Subsequent to the successful handover execution, i.e. reception of HANDOVER CONFIRM message for the migrating IAB-MT/IAB-nodes and/or UEs, the target CU performs step (i) to (iii) above.

In this scenario the target CU 30 has connectivity to all AMFs that are serving all IAB-MTs and UEs that are considered in this migration procedure. Otherwise PATH SWITCH cannot be used for the AMFs that do not have connectivity to target CU.

Alternatively, according to certain embodiments, the source CU 20 may send N2 HANDOVER REQUIRED message to all AMFs serving the IAB-MT(s)/IAB-node(s) and the UE(s) served by the cells configured on the IAB-nodes. The HANDOVER REQUIRED message includes information that enables the target CU 30 to correlate the handover procedures of all involved/affected IAB-MT(s)/IAB-nodes and UE(s). Each AMF sends a N2 HANDOVER REQUEST message containing same information as the N2 HANDOVER REQUIRED message to the target CU 30.

To reduce the signaling load on the N2 interface, the N2 HANDOVER REQUIRED and REQUEST message can be enhanced to carry information pertaining to all IAB-MTs/IAB-nodes and UEs served by the AMF which UE-associated logical NG-connection over the NG interface are to be switched from source CU to target CU. Alternatively, a new NGAP message can be defined, carrying information pertaining to all IAB-MTs/IAB-nodes and/or UEs served by the AMF which UE-associated logical NG-connection over the NG interface are to be switched from source CU to target CU.

Figure 8:
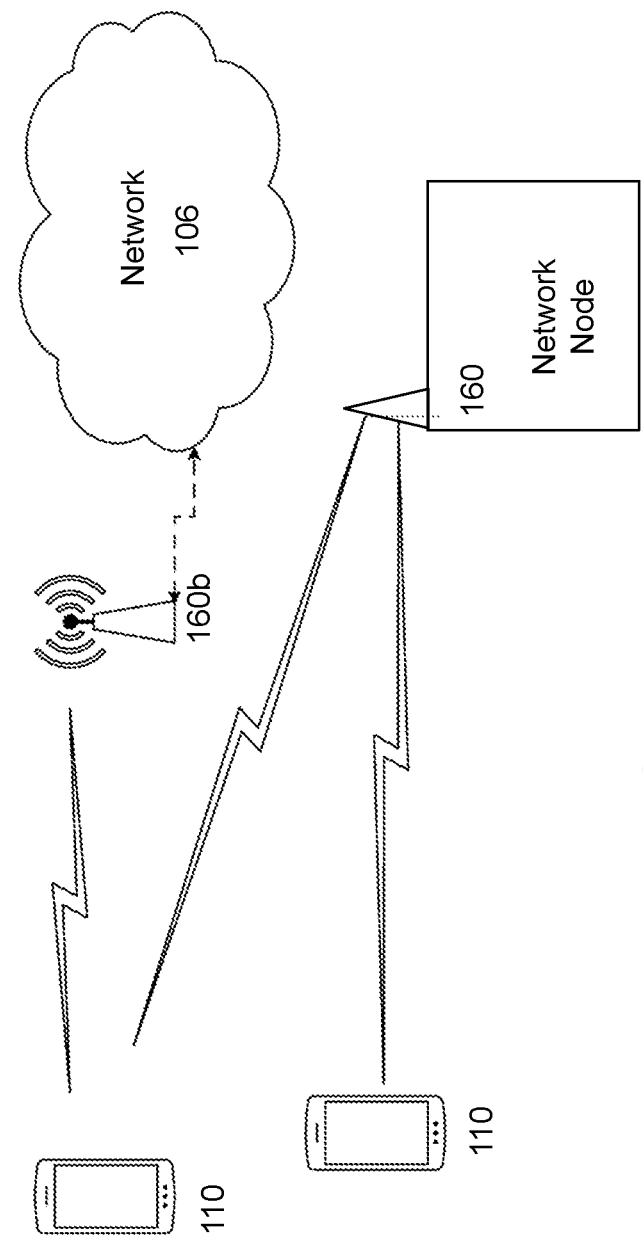
FIG. 8 illustrates an example wireless network, according to certain embodiments.

According to certain embodiments, at N2 Handover where IAB-MT(s)/IAB-node(s) and UE(s) are served by AMF(s) that do not have connectivity to the target CU 30 and therefore the serving AMF(s) will be changed, IAB-MT(s)/IAB-node(s) and UE(s) are handed over by N2 handover procedures conducted in parallel to the N2 handover procedure for the migrating (i.e. top-level) IAB-MT/IAB-node. The source AMF(s) include the information received from the source CU 20 in the N2 HANDOVER REQUIRED message(s), i.e. information that enables the target CU 30 to correlate the handover procedures of all involved/affected IAB-MT(s)/IAB-nodes and UE(s), indication which IAB-MT/IAB-node's radio interface must be reconfigured, information on whether the subject to handover is an IAB-MT/IAB-node or a UE as well as the F1AP UE Context information, if available, in the message/service over the N14 interface to the target AMF(s). This information is subsequently included in the N2 HANDOVER REQUEST message(s) sent from the respective AMF(s) to the target FIG. 8 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 106, network nodes 160 and 160b, and wireless devices 110. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 9:
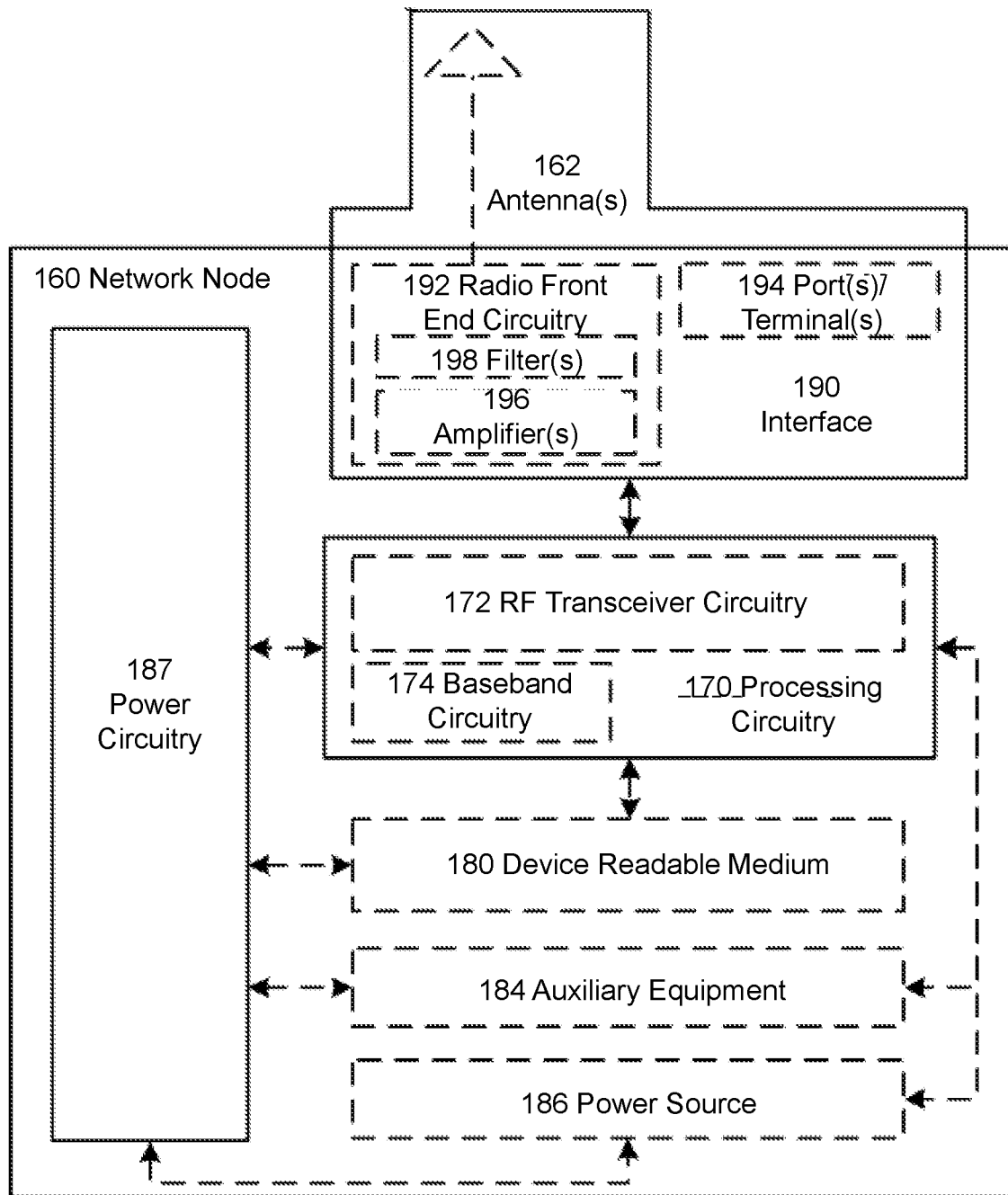
FIG. 9 illustrates an example network node, according to certain embodiments.

FIG. 9 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 160 includes processing circuitry 170, device readable medium 180, interface 190, auxiliary equipment 184, power source 186, power circuitry 187, and antenna 162. Although network node 160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170.

In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 9 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 10:
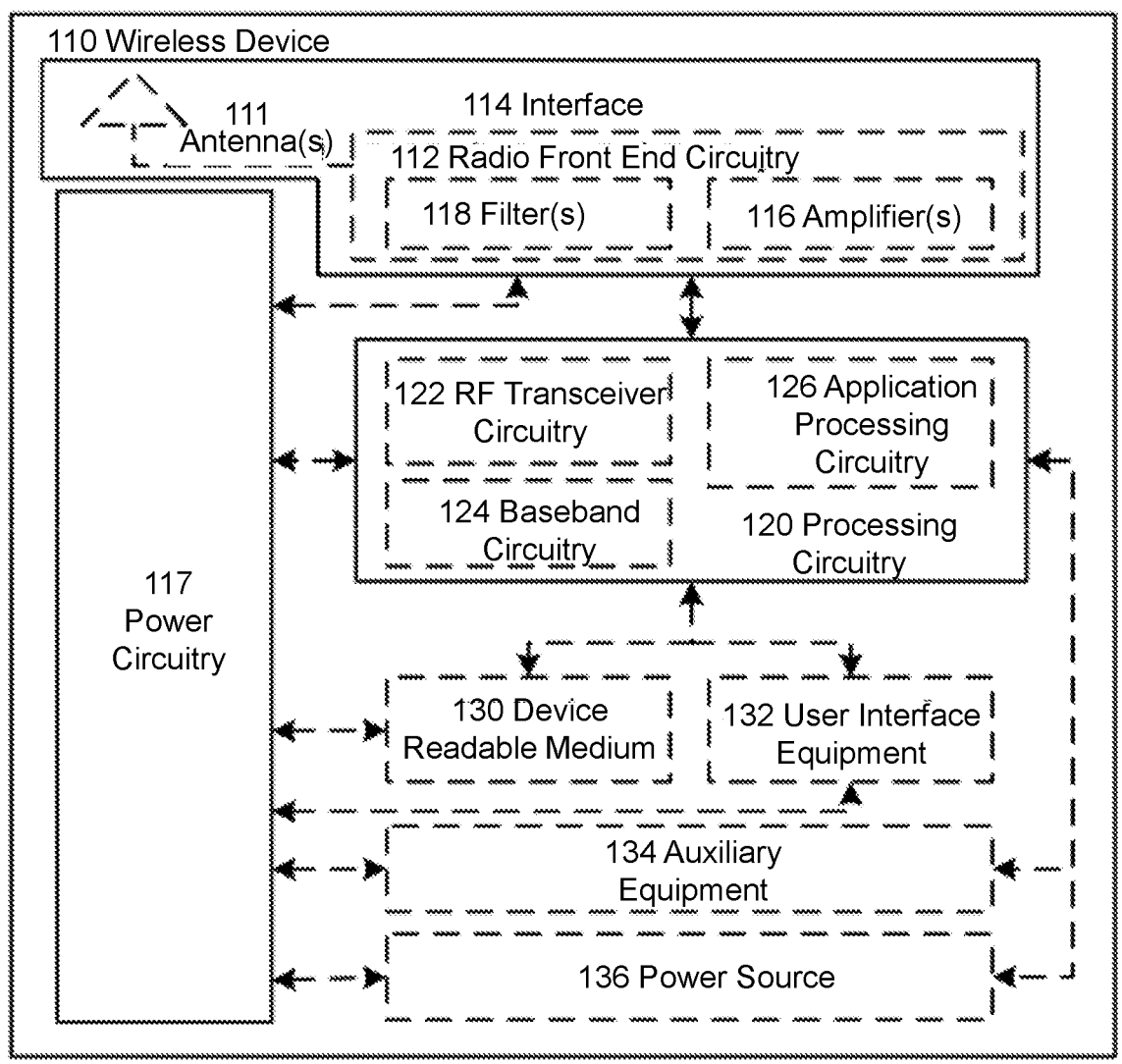
FIG. 10 illustrates an example wireless device, according to certain embodiments.

FIG. 10 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 11:
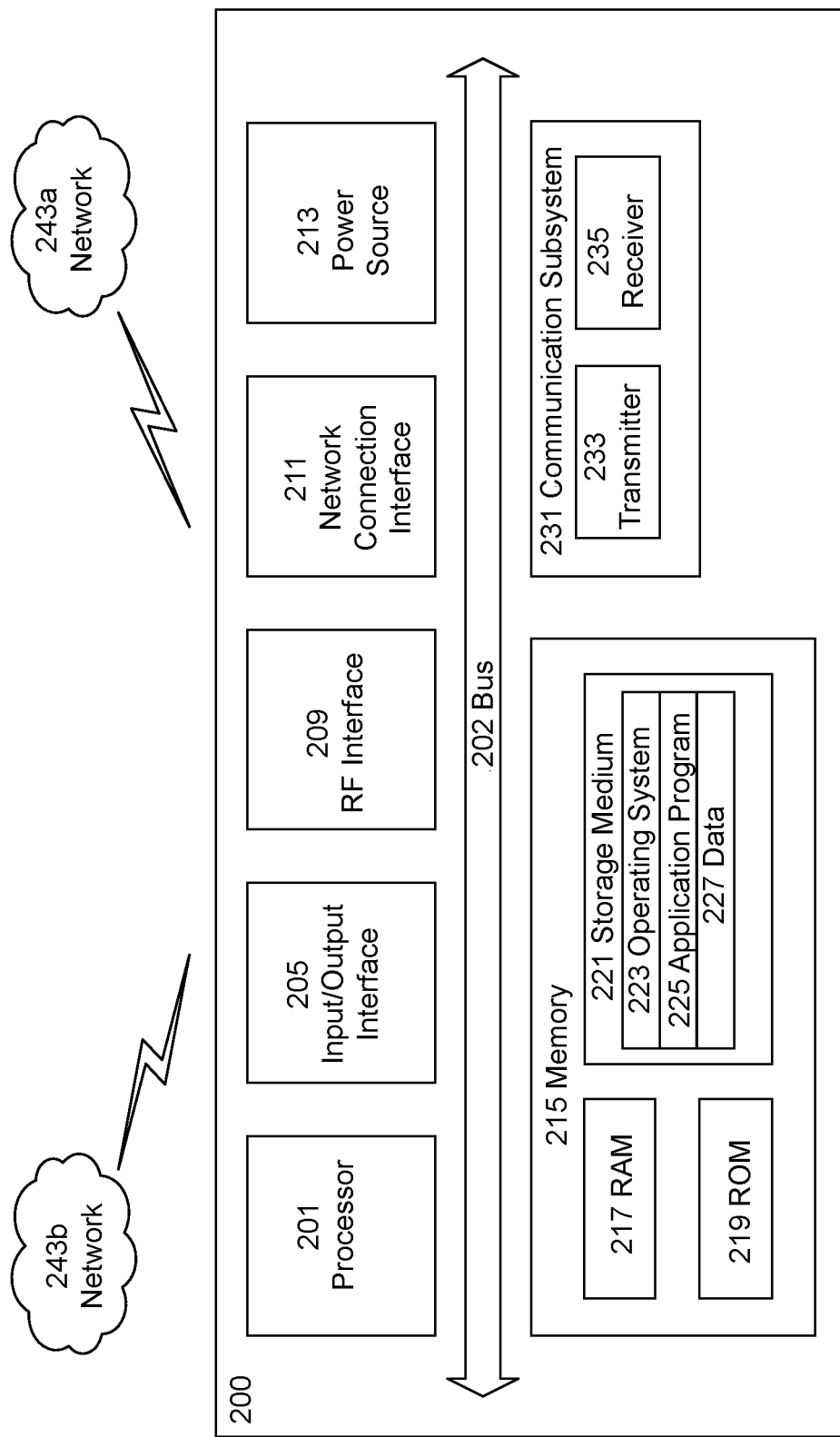
FIG. 11 illustrate an example user equipment, according to certain embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 9, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 11 is a UE, the components discussed herein are equally applicable to a wireless device, and vice-versa.

In FIG. 11, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 11, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 12:
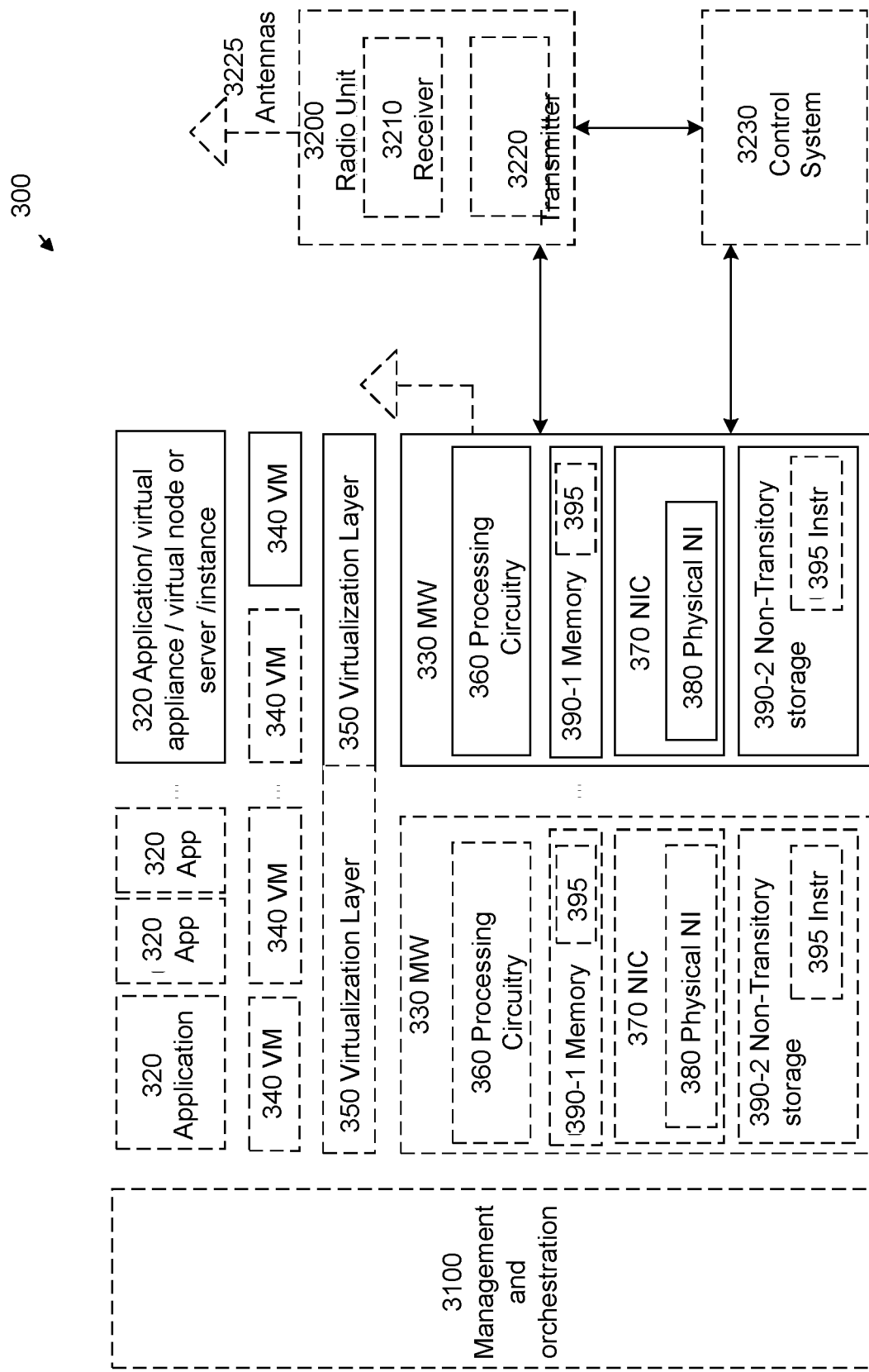
FIG. 12 illustrates a virtualization environment in which functions implemented by some embodiments may be virtualized, according to certain embodiments.

FIG. 12 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 12, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 12.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 13:
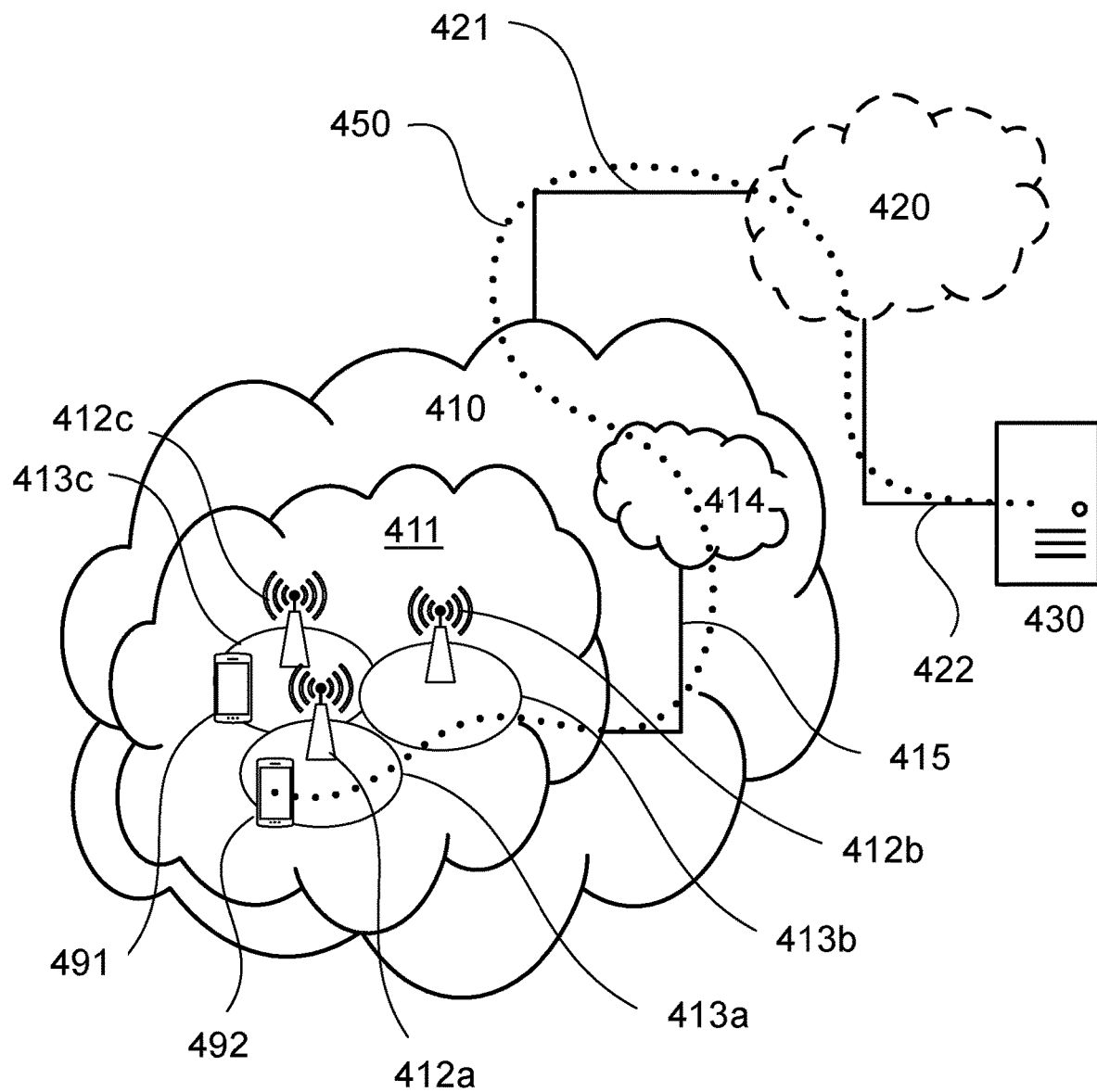
FIG. 13 illustrates a telecommunication network connected via an intermediate network to a host computer, according to certain embodiments.

FIG. 13 illustrates a telecommunication network connected via an intermediate network to a host computer in accordance with some embodiments. In accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 13 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 14:
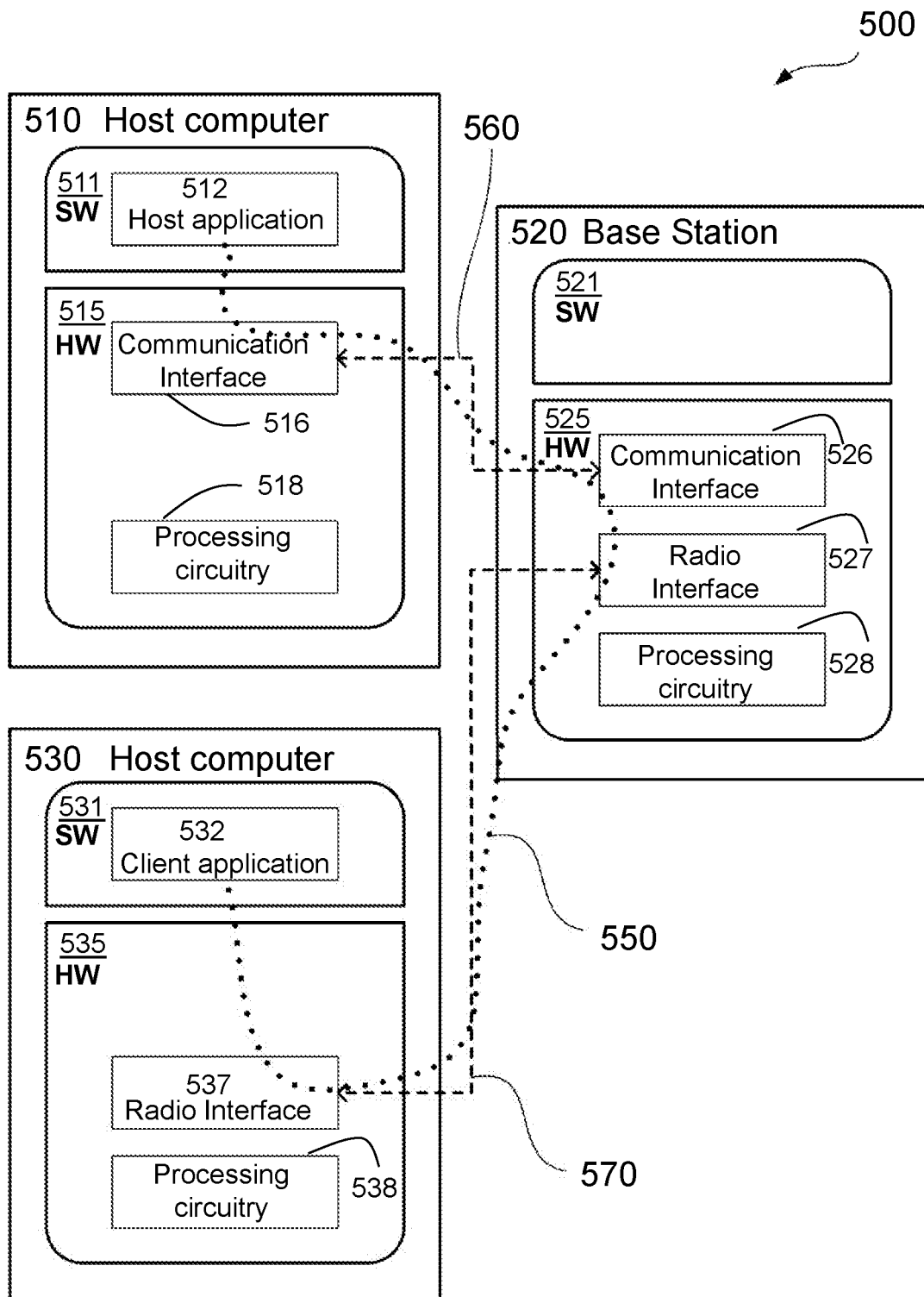
FIG. 14 illustrates a generalized block diagram of a host computer communicating via a base station with a user equipment over a partially wireless connection, according to certain embodiments.

FIG. 14 illustrates a host computer communicating via a base station with a user equipment over a partially wireless connection in accordance with some embodiments. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 14) served by base station 520. Communication interface 526 may be configured to facilitate connection 560 to host computer 510. Connection 560 may be direct or it may pass through a core network (not shown in FIG. 14) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 14 may be similar or identical to host computer 430, one of base stations 412a, 412b, 412c and one of UEs 491, 492 of FIG. 13, respectively. This is to say, the inner workings of these entities may be as shown in FIG. 14 and independently, the surrounding network topology may be that of FIG. 13.

In FIG. 14, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 15, 16:
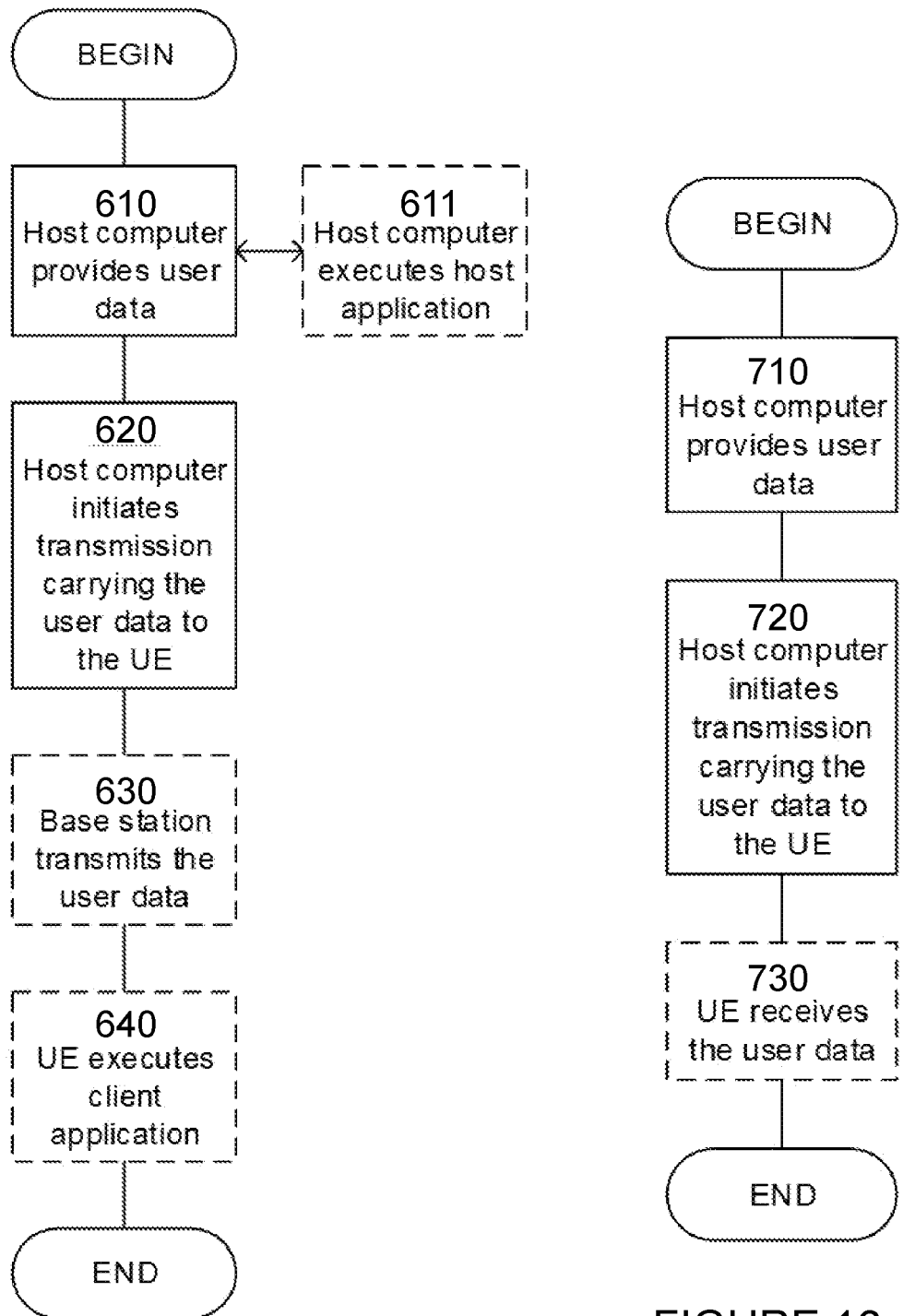
FIG. 15 illustrates a method implemented in a communication system, according to one embodiment.
FIG. 16 illustrates another method implemented in a communication system, according to one embodiment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 17, 18:
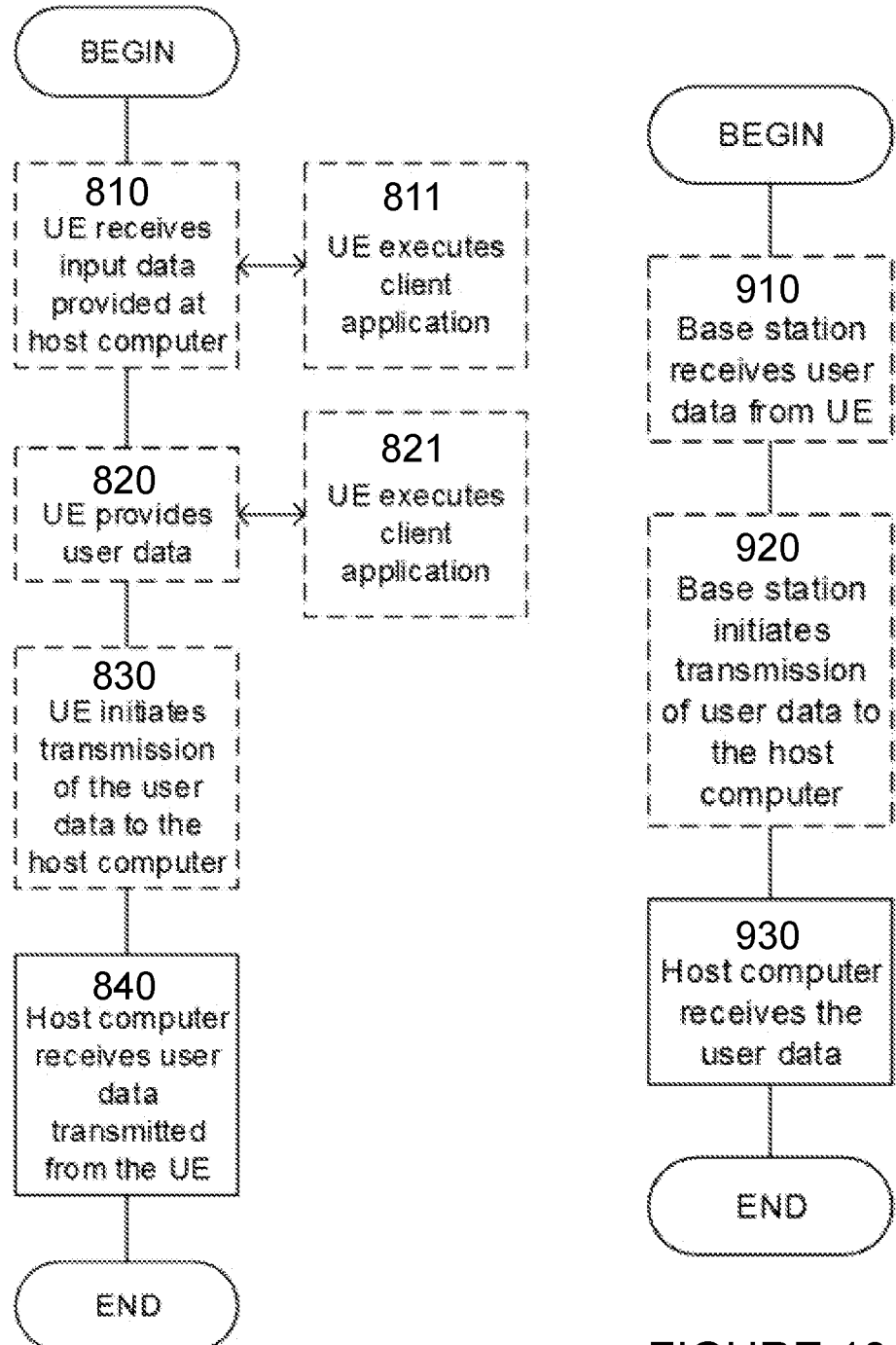
FIG. 17 illustrates another method implemented in a communication system, according to one embodiment.
FIG. 18 illustrates another method implemented in a communication system, according to one embodiment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 810 (which may be optional), the UE receives input data provided by the host computer.

Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 19:
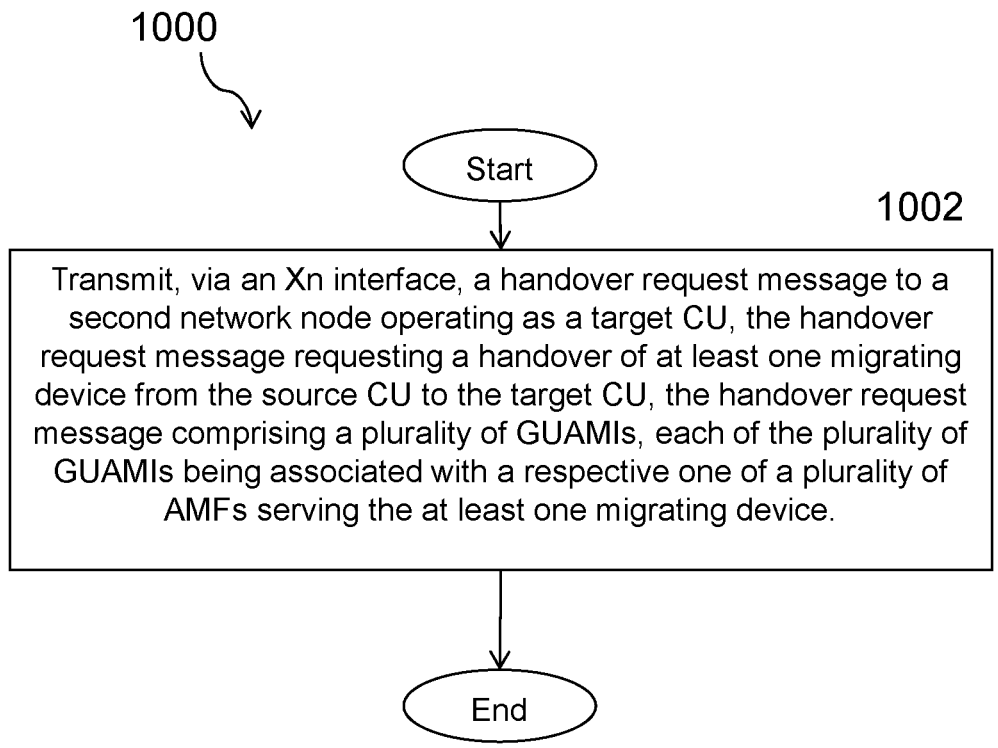
FIG. 19 illustrate a method by a first network node operating as source CU in an IAB network, according to certain embodiments.

FIG. 19 depicts a method 1000 by a first network node 160 operating as source CU in an IAB network, according to certain embodiments. The method begins at step 1002 when the first network node transmits, via an Xn interface, a handover request message to a second network node operating as a target CU. The handover request message requests a handover of at least one migrating device from the source CU to the target CU, and the handover request message comprises a plurality of GUAMIs. Each of the plurality of GUAMIs being associated with a respective one of a plurality of AMFs serving the at least one migrating device.

Figure 20:
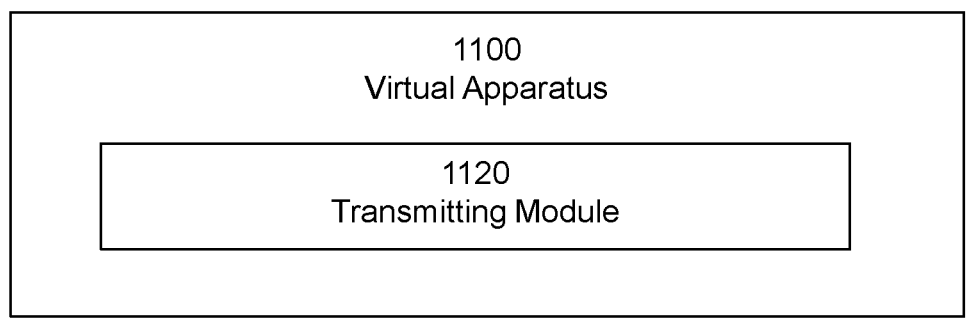
FIG. 20 illustrates an example virtual apparatus, according to certain embodiments.

FIG. 20 illustrates a schematic block diagram of a virtual apparatus 1100 in a wireless network (for example, the wireless network shown in FIG. 8). The apparatus may be implemented in a wireless device or network node (e.g., wireless device 110 or network node 160 shown in FIG. 8). Apparatus 1100 is operable to carry out the example method described with reference to FIG. 19 and possibly any other processes or methods disclosed herein. It is also to be understood that the method of FIG. 19 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module M10 and any other suitable units of apparatus 1100 to perform corresponding functions according one or more embodiments of the present disclosure.

According to certain embodiments, transmitting module 1110 may perform certain of the transmitting functions of the apparatus 1100. For example, transmitting module 1110 may transmit, via an Xn interface, a handover request message to a second network node operating as a target CU. The handover request message requests a handover of at least one migrating device from the source CU to the target CU, and the handover request message comprises a plurality of GUAMIs. Each of the plurality of GUAMIs being associated with a respective one of a plurality of AMFs serving the at least one migrating device.

As used herein, the term module may have conventional meaning in the field of electronics, electrical devices and/or electronic devices and may include, for example, electrical and/or electronic circuitry, devices, units, processors, memories, logic solid state and/or discrete devices, computer programs or instructions for carrying out respective tasks, procedures, computations, outputs, and/or displaying functions, and so on, as such as those that are described herein.

Figure 21:
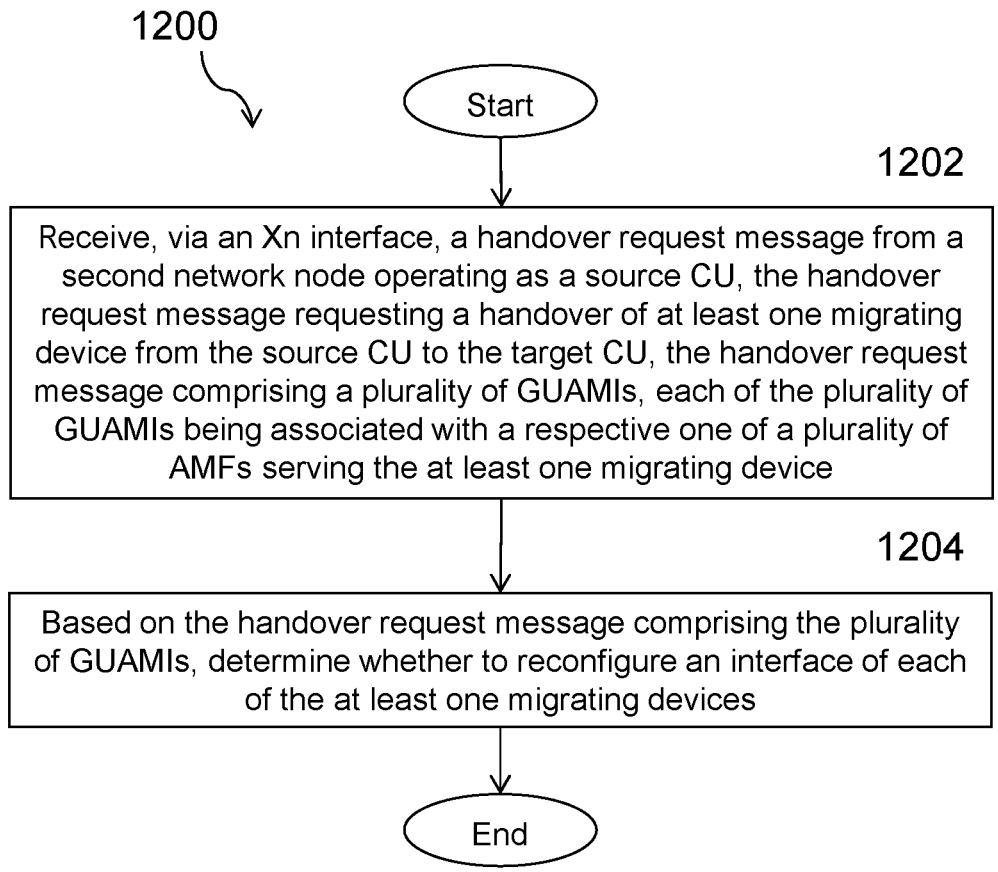
FIG. 21 illustrates an example method by a first network node operating as a target CU in a IAB network, according to certain embodiments.

FIG. 21 depicts a method 1200 by a first network node 160 operating as a target CU in a IAB network, according to certain embodiments. The method begins at step 1202 when the first network node receives, via an Xn interface, a handover request message from a second network node operating as a source CU. The handover request message requests a handover of at least one migrating device from the source CU to the target CU. The handover request message comprises a plurality of GUAMIs. Each of the plurality of GUAMIs being associated with a respective one of a plurality of AMFs serving the at least one migrating device. Based on the handover request message comprising the plurality of GUAMIs, the first network node determines whether to reconfigure an air interface of each of the at least one migrating devices, at step 1204.

Figure 22:
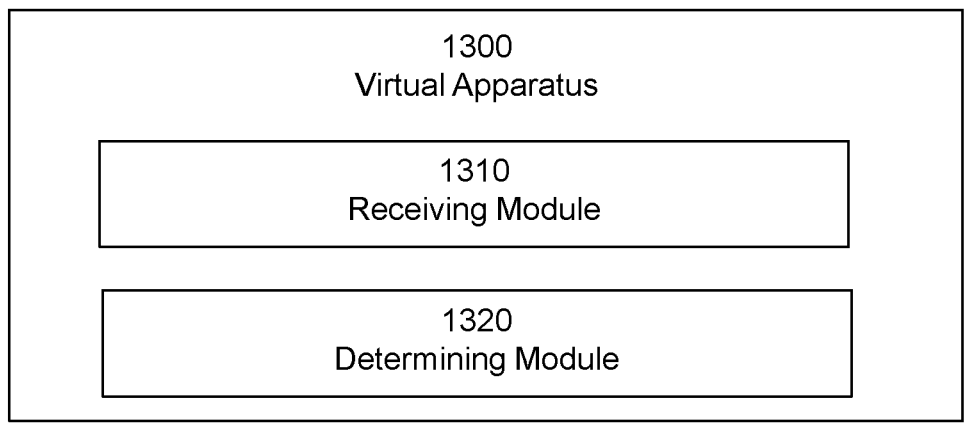
FIG. 22 illustrates another example virtual apparatus, according to certain embodiments.

FIG. 22 illustrates a schematic block diagram of a virtual apparatus 1300 in a wireless network (for example, the wireless network shown in FIG. 8). The apparatus may be implemented in a wireless device or network node (e.g., wireless device 110 or network node 160 shown in FIG. 8). Apparatus P00 is operable to carry out the example method described with reference to FIG. 21 and possibly any other processes or methods disclosed herein. It is also to be understood that the method of FIG. 21 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1310, determining module 1320, and any other suitable units of apparatus 1300 to perform corresponding functions according one or more embodiments of the present disclosure.

According to certain embodiments, receiving module 1310 may perform certain of the determining functions of the apparatus 1300. For example, receiving module 1310 may receive, via an Xn interface, a handover request message from a second network node operating as a source CU. The handover request message requests a handover of at least one migrating device from the source CU to the target CU. The handover request message comprises a plurality of GUAMIs. Each of the plurality of GUAMIs being associated with a respective one of a plurality of AMFs serving the at least one migrating device.

According to certain embodiments, performing module 1320 may perform certain of the performing functions of the apparatus 1300. For example, performing module 1320 may determine whether to reconfigure an air interface of each of the at least one migrating devices based on the handover request message comprising the plurality of GUAMIs.

Figure 23:
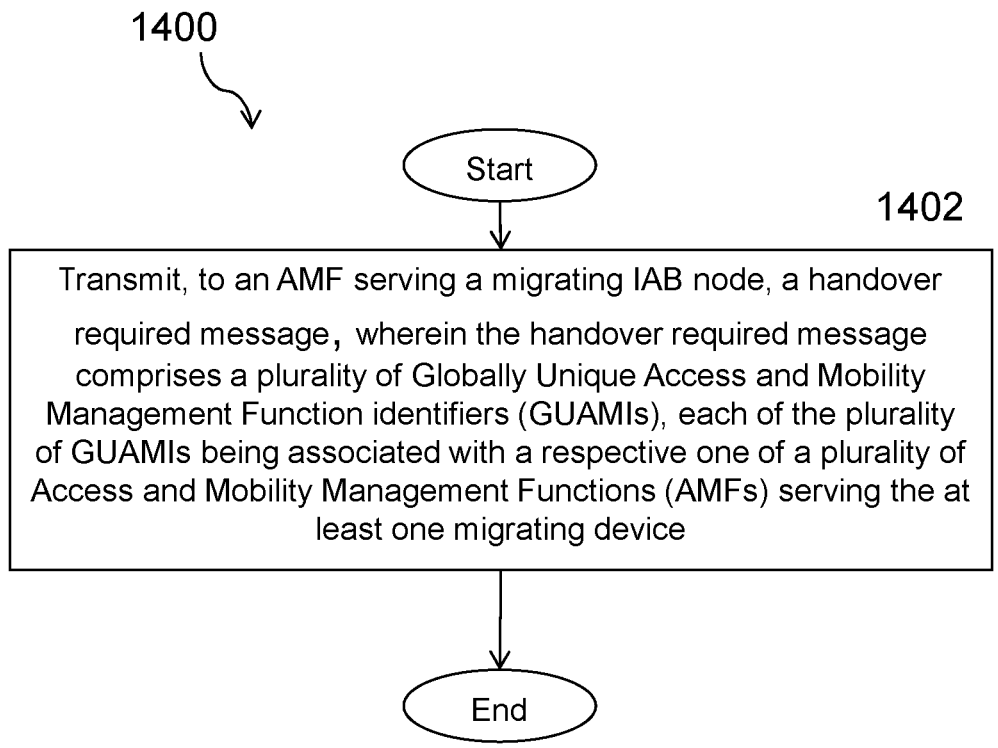
FIG. 23 illustrates a method by a first network node operating as source CU in an IAB network, according to certain embodiments.

FIG. 23 depicts a method 1400 by a first network node 160 operating as source CU in an IAB network, according to certain embodiments. The method begins at step 1402 when the first network node transmits, to an AMF serving a migrating IAB node, a handover required message, wherein the handover required message comprises a plurality of GUAMIs. Each of the plurality of GUAMIs being associated with a respective one of a plurality of AMFs serving the at least one migrating device.

Figure 24:
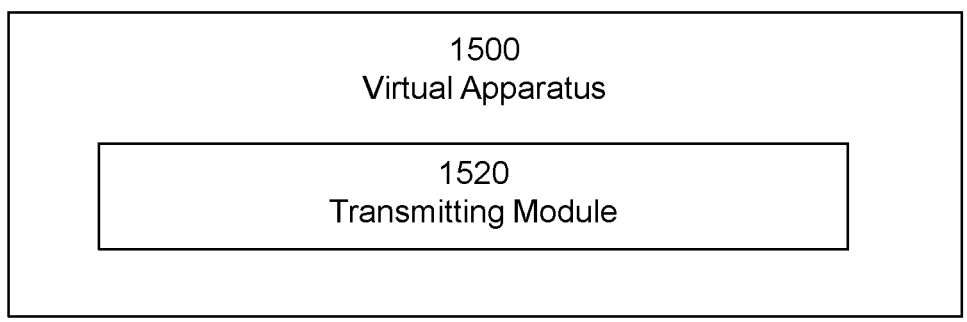
FIG. 24 illustrates another example virtual apparatus, according to certain embodiments.

FIG. 24 illustrates a schematic block diagram of a virtual apparatus 1500 in a wireless network (for example, the wireless network shown in FIG. 8). The apparatus may be implemented in a wireless device or network node (e.g., wireless device 110 or network node 160 shown in FIG. 8). Apparatus 1500 is operable to carry out the example method described with reference to FIG. 23 and possibly any other processes or methods disclosed herein. It is also to be understood that the method of FIG. 23 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1510 and any other suitable units of apparatus 1500 to perform corresponding functions according one or more embodiments of the present disclosure.

According to certain embodiments, transmitting module 1510 may perform certain of the determining functions of the apparatus 1500. For example, transmitting module 1510 may transmit, to an AMF serving a migrating IAB node, a handover required message, wherein the handover required message comprises a plurality of GUAMIs. Each of the plurality of GUAMIs being associated with a respective one of a plurality of AMFs serving the at least one migrating device.

Figure 25:
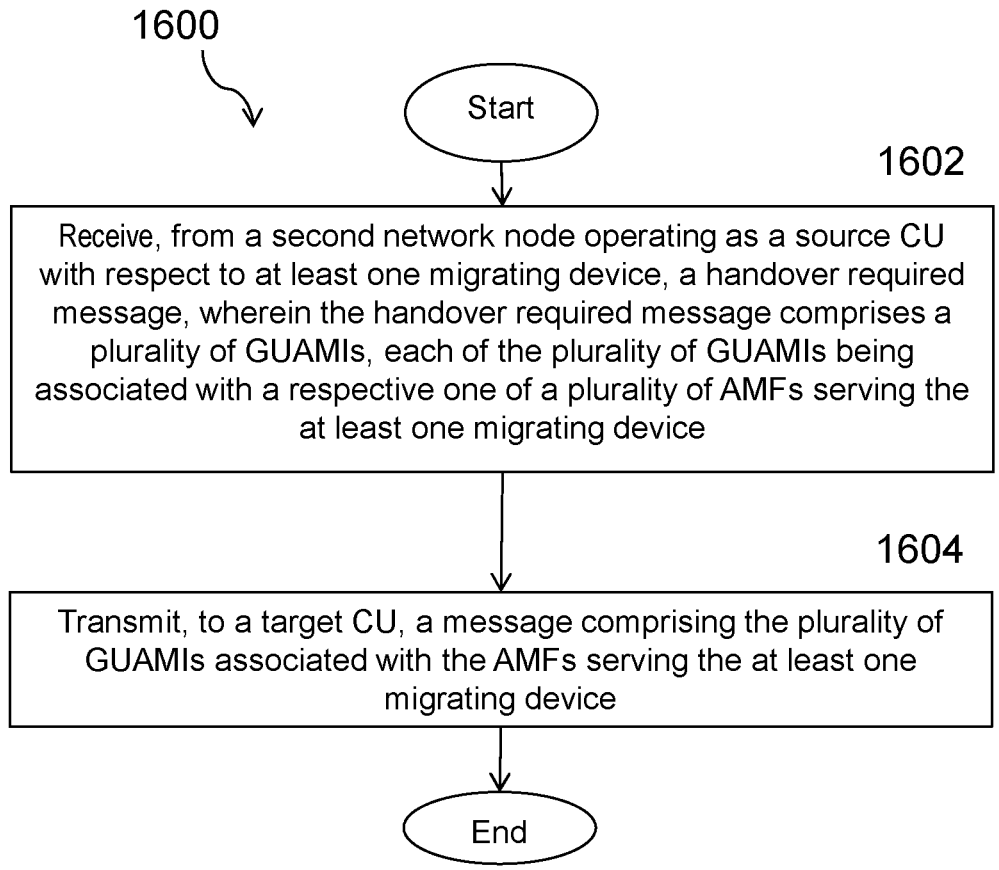
FIG. 25 illustrates an example method by a first network node operating as an AMF in an IAB network, according to certain embodiments.

FIG. 25 depicts a method 1600 by a first network node 160 operating as an AMF in an IAB network, according to certain embodiments. The method begins at step 1602 when the first network node receives, from a second network node operating as a source CU with respect to at least one migrating device, a handover required message. The handover required message comprises a plurality of GUAMIs. Each of the plurality of GUAMIs is associated with a respective one of a plurality of AMFs serving the at least one migrating device. At step 1604, the first network node transmits, to a target CU, a message comprising the plurality of GUAMIs associated with the AMFs serving the at least one migrating device.

Figure 26:
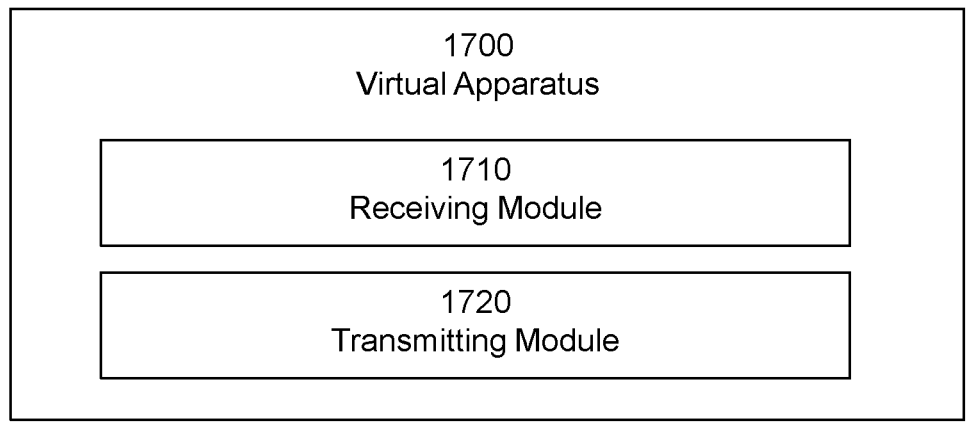
FIG. 26 illustrates another example virtual apparatus, according to certain embodiments.

FIG. 26 illustrates a schematic block diagram of a virtual apparatus 1700 in a wireless network (for example, the wireless network shown in FIG. 8). The apparatus may be implemented in a wireless device or network node (e.g., wireless device 110 or network node 160 shown in FIG. 8). Apparatus 1700 is operable to carry out the example method described with reference to FIG. 25 and possibly any other processes or methods disclosed herein. It is also to be understood that the method of FIG. 25 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1710, transmitting module 1720, and any other suitable units of apparatus 1700 to perform corresponding functions according one or more embodiments of the present disclosure.

According to certain embodiments, receiving module 1710 may perform certain of the determining functions of the apparatus 1700. For example, receiving module 1710 may receive, from a second network node operating as a source CU with respect to at least one migrating device, a handover required message. The handover required message comprises a plurality of GUAMIs. Each of the plurality of GUAMIs is associated with a respective one of a plurality of AMFs serving the at least one migrating device.

According to certain embodiments, transmitting module 1720 may perform certain of the transmitting functions of the apparatus 1700. For example, transmitting module 1720 may transmit, to a target CU, a message comprising the plurality of GUAMIs associated with the AMFs serving the at least one migrating device.

Figure 27:
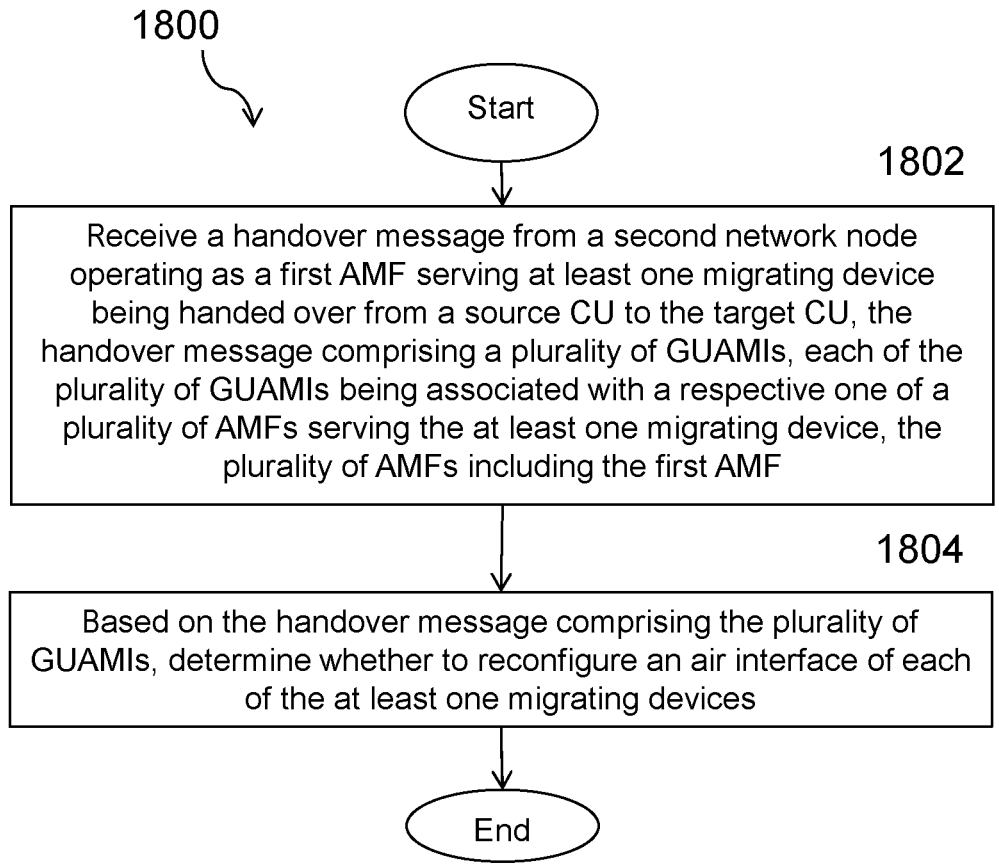
FIG. 27 illustrates another example method by a first network node operating as a target CU in an IAB network, according to certain embodiments.

FIG. 27 depicts a method 1800 by a first network node 160 operating as a target CU in an IAB network, according to certain embodiments. The method begins at step 1802 when the first network node receives a handover message from a second network node operating as a first AMF serving at least one migrating device being handed over from a source CU to the target CU. The handover message includes a plurality of GUAMIs, and each of the plurality of GUAMIs is associated with a respective one of a plurality of AMFs serving the at least one migrating device. The plurality of AMFs including the first AMF. Based on the handover message comprising the plurality of GUAMIs, the first network node determines whether to reconfigure an air interface of each of the at least one migrating devices, at step 1804.

Figure 28:
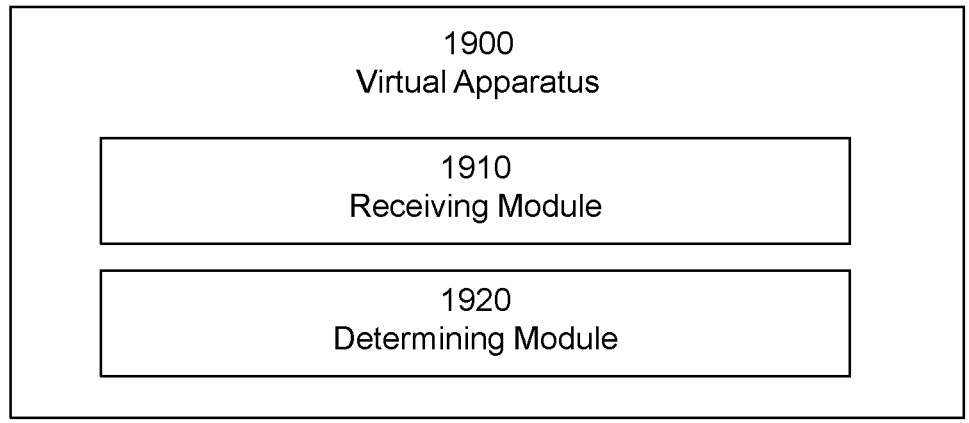
FIG. 28 illustrates another example virtual apparatus, according to certain embodiments.

FIG. 28 illustrates a schematic block diagram of a virtual apparatus 1900 in a wireless network (for example, the wireless network shown in FIG. 8). The apparatus may be implemented in a wireless device or network node (e.g., wireless device 110 or network node 160 shown in FIG. 8). Apparatus 1900 is operable to carry out the example method described with reference to FIG. 27 and possibly any other processes or methods disclosed herein. It is also to be understood that the method of FIG. 17 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1910, determining module 1920, and any other suitable units of apparatus 1900 to perform corresponding functions according one or more embodiments of the present disclosure.

According to certain embodiments, receiving module 1910 may perform certain of the receiving functions of the apparatus 1900. For example, receiving module 1910 may receive a handover message from a second network node operating as a first AMF serving at least one migrating device being handed over from a source CU to the target CU. The handover message includes a plurality of GUAMIs, and each of the plurality of GUAMIs is associated with a respective one of a plurality of AMFs serving the at least one migrating device. The plurality of AMFs including the first AMF.

According to certain embodiments, determining module 1920 may perform certain of the determining functions of the apparatus 1900. For example, determining module 1920 may determine whether to reconfigure an air interface of each of the at least one migrating devices based on the handover message comprising the plurality of GUAMIs.

Figure 29:
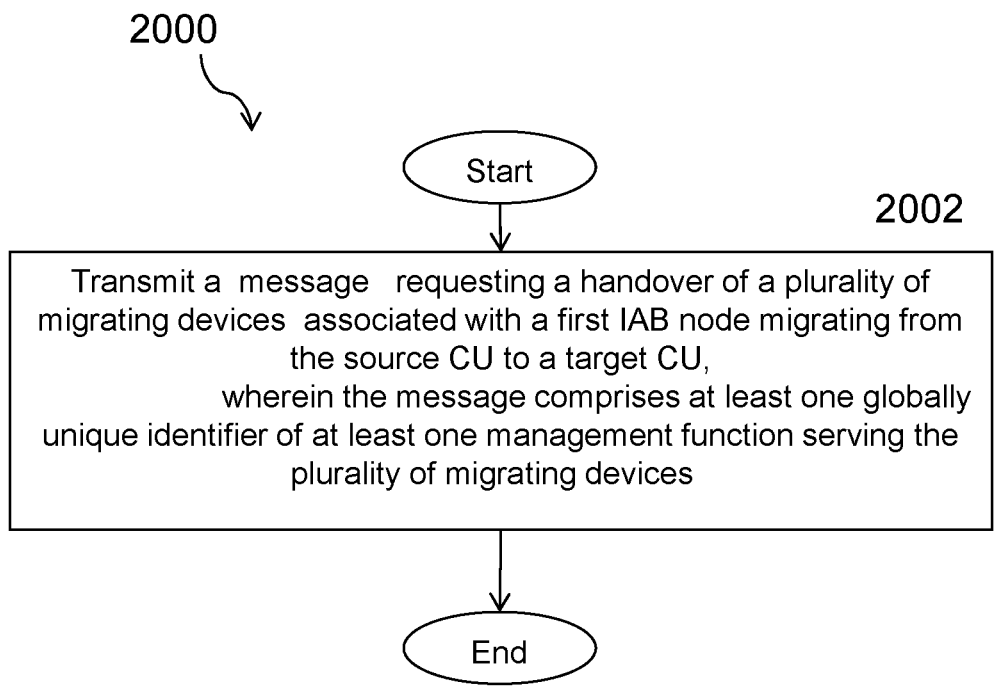
FIG. 29 illustrates another example method by a source CU in an IAB network, according to certain embodiments.

FIG. 29 depicts a method 2000 by a source CU in an IAB network, according to certain embodiments. The method begins at step 2002 when the source CU transmits a message requesting a handover of a plurality of migrating devices associated with a first IAB node migrating from the source CU to a target CU. The message includes at least one globally unique identifier of at least one management function serving the plurality of migrating devices.

In a particular embodiment, the message is transmitted to the target CU and the message comprises a handover request message. Alternatively, the message is transmitted to at least one AMF and the message comprises a handover required message.

In a particular embodiment, the at least one globally unique identifier of the management function comprises at least one GUAMI associated with at least one AMF serving the plurality of migrating devices. The at least one GUAMI is transmitted over an Xn interface.

In a further particular embodiment, the at least one AMF comprises a plurality of AMFs, and each AMF is associated with a cell configured for at least one of the plurality of migrating devices.

In a particular embodiment, the at least one globally unique identifier of the management function comprises at least one GUMMEI associated with at least one MME serving the plurality of migrating devices, and the at least one GUMMEI transmitted over an X2 or an F1 interface.

In a particular embodiment, the message indicates whether each one of the plurality of migrating devices is a UE or an IAB.

In a particular embodiment, the message indicates at least one radio interface associated with the plurality of migrating devices that is to be reconfigured by a target CU and/or at least one radio interface associated with the plurality of migrating devices that is not to be reconfigured by a target CU.

In a particular embodiment, the message indicates a radio interface associated with an IAB node that directly and indirectly serves each of the plurality of migrating devices, the radio interface being indicated for reconfiguration by a target CU.

In a particular embodiment, the message comprises F1AP UE context information for each one of the plurality of migrating devices and/or F1AP UE context information for any UEs served by cells configured for the plurality of migrating devices.

Figure 30:
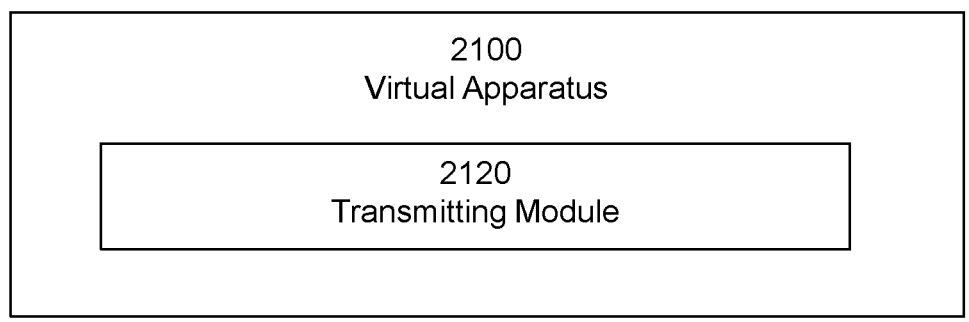
FIG. 30 illustrates another example virtual apparatus, according to certain embodiments.

FIG. 30 illustrates a schematic block diagram of a virtual apparatus 2100 in a wireless network (for example, the wireless network shown in FIG. 8). The apparatus may be implemented in a wireless device or network node (e.g., wireless device 110 or network node 160 shown in FIG. 8). Apparatus 2100 is operable to carry out the example method described with reference to FIG. 29 and possibly any other processes or methods disclosed herein. It is also to be understood that the method of FIG. 29 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 2110 and any other suitable units of apparatus 2100 to perform corresponding functions according one or more embodiments of the present disclosure.

According to certain embodiments, transmitting module 2110 may perform certain of the transmitting functions of the apparatus 2100. For example, transmitting module 2110 may transmit a message requesting a handover of a plurality of migrating devices associated with a first IAB node migrating from the source CU to a target CU. The message includes at least one globally unique identifier of at least one management function serving the plurality of migrating devices.

Figure 31:
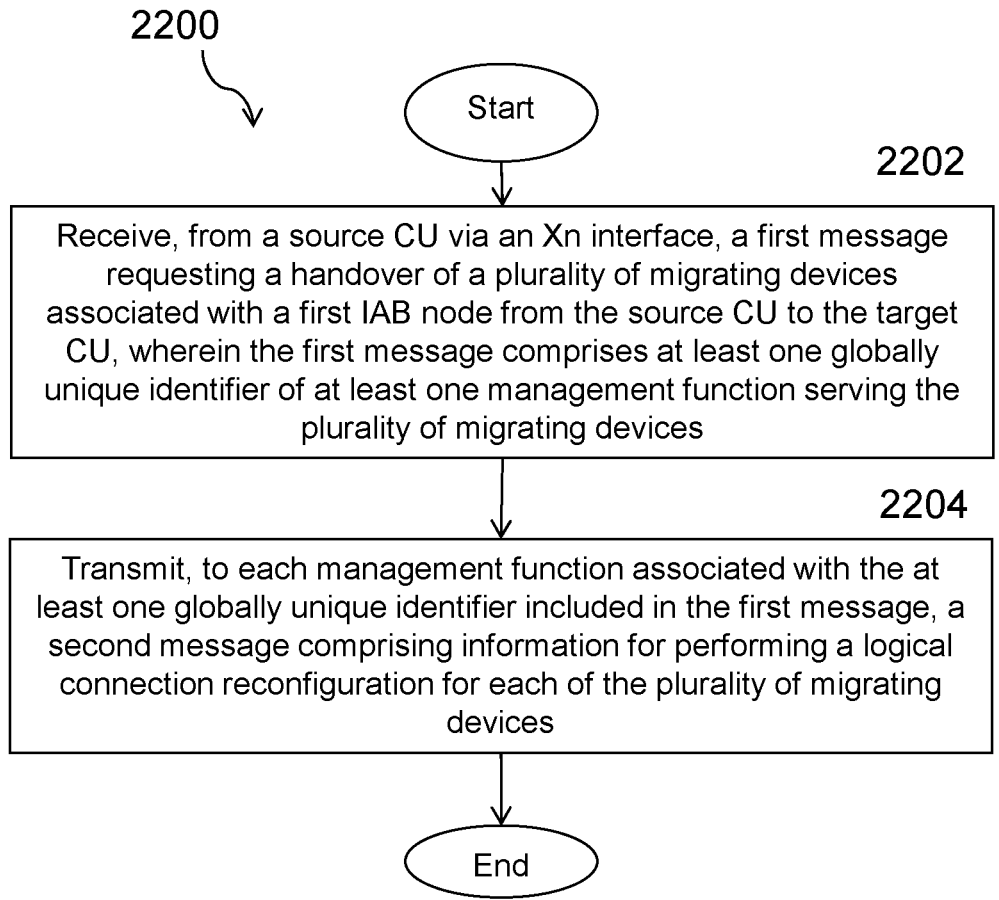
FIG. 31 illustrates another example method by a target CU in an IAB network, according to certain embodiments.

FIG. 31 depicts a method 2200 by a target CU in an IAB network, according to certain embodiments. The method begins at step 2002 when the target CU receives, from a source CU via an Xn interface, a first message requesting a handover of a plurality of migrating devices associated with a first IAB node from the source CU to the target CU. The first message includes at least one globally unique identifier of at least one management function serving the plurality of migrating devices. At step 2004, the target CU transmits, to each management function associated with the at least one globally unique identifier included in the first message, a second message comprising information for performing a logical connection reconfiguration for each of the plurality of migrating devices.

In a particular embodiment, the at least one globally unique identifier comprises at least one GUAMI associated with at least one AMF serving the plurality of migrating devices, and the at least one GUAMI transmitted in the second message over the Xn interface.

In a particular embodiment, the at least one AMF comprises a plurality of AMFs, and wherein each AMF is associated with a cell configured for at least one of the plurality of migrating devices.

In a particular embodiment, the at least one globally unique identifier of comprises at least one GUMMEI associated with at least one MME serving the plurality of migrating devices, the at least one GUMMEI transmitted in the second message over an X2 or an F1 interface.

In a particular embodiment, the first message comprises a handover request message.

In a particular embodiment, at least one of the first message and the second message indicates whether each one of the plurality of migrating devices is a UE or an IAB node.

In a particular embodiment, at least one of the first message and the second message indicate: at least one radio interface associated with the plurality of migrating devices that is to be reconfigured by the target CU, and/or at least one radio interface associated with the plurality of migrating devices that is not to be reconfigured by the target CU.

In a particular embodiment, the target CU performs, based on the first message, at least one of: determining to reconfigure an air interface associated with a migrating device that operates as an IAB node that either directly or indirectly serves all of the plurality of migrating devices; determining not to reconfigure an air interface of any of the plurality of migrating devices that operate as an IAB node that does not serve every other one of the at least one migrating devices; and determining not to reconfigure an air interfaces of any of the plurality of migrating devices that are UEs.

In a particular embodiment, the first message comprises F1AP UE context information for each one of the plurality of migrating devices and/or F1AP UE context information for any UEs served by cells configured on the plurality of migrating devices.

In a particular embodiment, the second message further comprises information for performing a logical connection reconfiguration for any UEs that are served by the at least one management function receiving the second message.

In a particular embodiment, the second message comprises a PATH SWITCH REQUEST message or an NGAP message other than a PATH SWITCH REQUEST.

Figure 32:
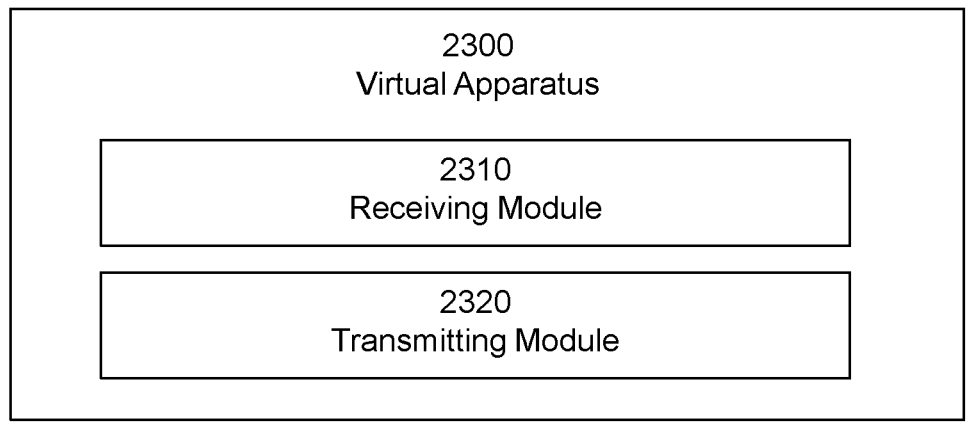
FIG. 32 illustrates another example virtual apparatus, according to certain embodiments.

FIG. 32 illustrates a schematic block diagram of a virtual apparatus 2300 in a wireless network (for example, the wireless network shown in FIG. 8). The apparatus may be implemented in a wireless device or network node (e.g., wireless device 110 or network node 160 shown in FIG. 8). Apparatus 2300 is operable to carry out the example method described with reference to FIG. 31 and possibly any other processes or methods disclosed herein. It is also to be understood that the method of FIG. 31 is not necessarily carried out solely by apparatus 2300. At least some operations of the method can be performed by one or more other entities.

Virtual Apparatus 2300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 2310, transmitting module 2320, and any other suitable units of apparatus 2300 to perform corresponding functions according one or more embodiments of the present disclosure.

According to certain embodiments, receiving module 2310 may perform certain of the receiving functions of the apparatus 2300. For example, receiving module 2310 may receive, from a source CU via an Xn interface, a first message requesting a handover of a plurality of migrating devices associated with a first IAB node from the source CU to the target CU. The first message includes at least one globally unique identifier of at least one management function serving the plurality of migrating devices.

According to certain embodiments, transmitting module 2320 may perform certain of the transmitting functions of apparatus 2300. For example, transmitting module 2320 may transmit, to each management function associated with the at least one globally unique identifier included in the first message, a second message comprising information for performing a logical connection reconfiguration for each of the plurality of migrating devices.

Figure 33:
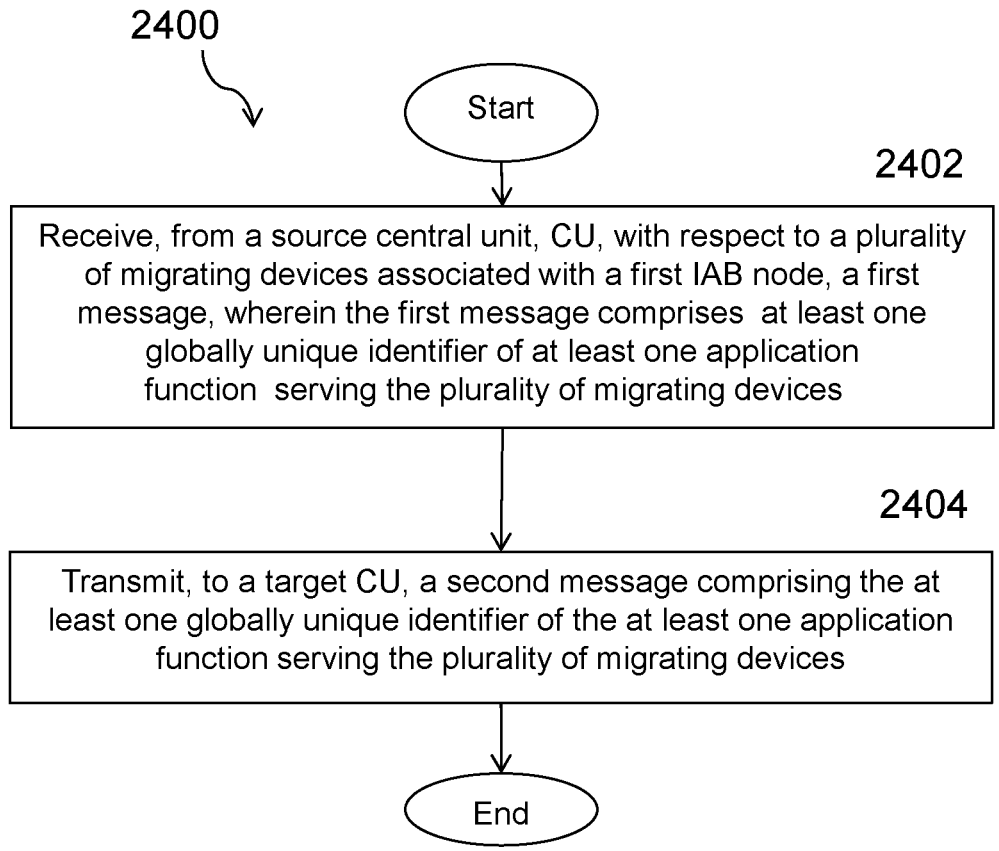
FIG. 33 illustrates an example method by a network node operating as a management function in an IAB network, according to certain embodiments.

FIG. 33 depicts a method 2400 by a network node 160 operating as a management function in an IAB network, according to certain embodiments. The method begins at step 2402 when the network node 160 receives, from a source CU, with respect to a plurality of migrating devices associated with a first IAB node, a first message. The first message includes at least one globally unique identifier of at least one application function serving the plurality of migrating devices. At step 2404, the management function transmits, to a target CU, a second message comprising the at least one globally unique identifier of the at least one application function serving the plurality of migrating devices.

In a particular embodiment, the at least one application function includes at least one AMF, and the at least one globally unique identifier comprises at least one GUAMI associated with the at least one AMF serving the plurality of migrating devices. The at least one GUAMI is received over an Xn interface.

In a particular embodiment, the at least one AMF comprises a plurality of AMFs, and each AMF is associated with a cell configured for at least one of the plurality of migrating devices.

In a particular embodiment, the at least one application function comprises at least one MME, and the at least one globally unique identifier comprises at least one GUMMEI associated with the at least one MME serving the plurality of migrating devices. The at least one GUMMEI is received over an X2 or an F1 interface.

In a particular embodiment, the first message comprises a handover required message.

In a particular embodiment, at least one of the first message and the second message indicates whether each one of the plurality of migrating devices is a UE or an IAB.

In a particular embodiment, at least one of the first message and the second message indicates: at least one radio interface associated with the plurality of migrating devices that is to be reconfigured, and/or at least one radio interface associated with the plurality of migrating devices that is not to be reconfigured.

In a particular embodiment, at least one of the first message and the second message indicate a radio interface associated with a second IAB node that directly and indirectly serves each of the plurality of migrating devices, the radio interface being indicated for reconfiguration.

In a particular embodiment, at least one of the first message and the second message comprise F1AP UE context information for each one of the plurality of migrating devices and/or F1AP UE context information for any UEs served by cells configured on the plurality of migrating devices.

Figure 34:
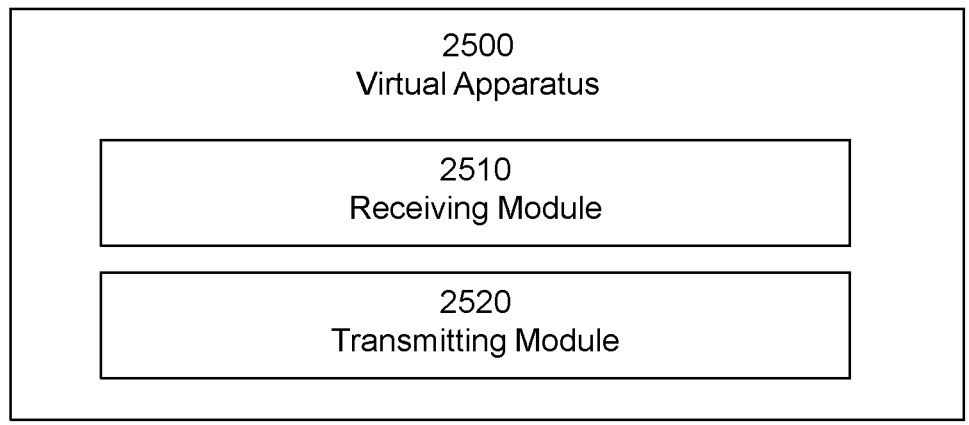
FIG. 34 illustrates another example virtual apparatus, according to certain embodiments.

FIG. 34 illustrates a schematic block diagram of a virtual apparatus 2500 in a wireless network (for example, the wireless network shown in FIG. 8). The apparatus may be implemented in a wireless device or network node (e.g., wireless device 110 or network node 160 shown in FIG. 8). Apparatus 2500 is operable to carry out the example method described with reference to FIG. 32 and possibly any other processes or methods disclosed herein. It is also to be understood that the method of FIG. 32 is not necessarily carried out solely by apparatus 2500. At least some operations of the method can be performed by one or more other entities.

Virtual Apparatus 2500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 2510, transmitting module 2520, and any other suitable units of apparatus 25300 to perform corresponding functions according one or more embodiments of the present disclosure.

According to certain embodiments, receiving module 2510 may perform certain of the receiving functions of the apparatus 2500. For example, receiving module 2510 may receive, from a source CU, with respect to a plurality of migrating devices associated with a first IAB node, a first message. The first message includes at least one globally unique identifier of at least one application function serving the plurality of migrating devices.

According to certain embodiments, transmitting module 2520 may perform certain of the transmitting functions of apparatus 2500. For example, transmitting module 2520 may transmit, to a target CU, a second message comprising the at least one globally unique identifier of the at least one application function serving the plurality of migrating devices.

EXAMPLE EMBODIMENTS

Group A1 Embodiments

Example Embodiment 1. A method performed by a first network node operating as source Central Unit (CU) in an Integrated Access and Wireless Access Backhaul (IAB) network, the method comprising: transmitting, via an Xn interface, a handover request message to a second network node operating as a target CU, the handover request message requesting a handover of at least one migrating device from the source CU to the target CU, wherein the handover request message comprises a plurality of Globally Unique Access and Mobility Management Function identifiers (GUAMIs), each of the plurality of GUAMIs being associated with a respective one of a plurality of Access and Mobility Management Functions (AMFs) serving the at least one migrating device.

Example Embodiment 2. The method of Embodiment 1, wherein the at least one migrating device comprises a IAB node and the handover request message indicates that the at least one migrating device is the IAB node.

Example Embodiment 3. The method of any one of Embodiments 1 to 2, wherein the at least one migrating device comprises a User Equipment (UE) and the handover request message indicates that the at least one migrating device is the UE.

Example Embodiment 4. The method of any one of Embodiments 1 to 3, wherein the at least one migrating device comprises a plurality of User Equipments (UE) and/or IAB nodes, and wherein the handover request message indicates the plurality of User Equipments (UE) and/or IAB nodes.

Example Embodiment 5. The method of any one of Embodiments 1 to 4, wherein each of plurality of AMFs are serving a cell configured for the at least one migrating device.

Example Embodiment 6. The method of any one of Embodiments 1 to 5, wherein the handover request message indicates at least one radio interface associated with the at least one migrating device that is to be reconfigured by the target CU.

Example Embodiment 7. The method of any one of Embodiments 1 to 6, wherein the handover request message indicates at least one radio interface associated with the at least one migrating device that is not to be reconfigured by the target CU.

Example Embodiment 8. The method of any one of Embodiments 1 to 7, wherein the handover request message indicates a radio interface associated with an IAB node that directly and indirectly serves each of the at least one migrating devices, the radio interface being indicated for reconfiguration by the target CU.

Example Embodiment 9. The method of any one of Embodiments 1 to 8, wherein the handover request message comprises F1AP UE context information for each one of the at least one migrating devices and/or F1AP UE context information for any UEs served by cells configured on the at least one migrating devices.

Example Embodiment 10. A computer program comprising instructions which when executed on a computer perform any of the methods of embodiments 1 to 9.

Example Embodiment 11. A computer program product comprising computer program, the computer program comprising instructions which when executed on a computer perform any of the methods of embodiments 1 to 9.

Example Embodiment 12. A non-transitory computer readable medium storing instructions which when executed by a computer perform any of the methods of embodiments 1 to 9.

Group A2 Embodiments

Example Embodiment 13. A method performed by a first network node operating as target Central Unit (CU) in an Integrated Access and Wireless Access Backhaul (IAB) network, the method comprising: receiving, via an Xn interface, a handover request message from a second network node operating as a source CU, the handover request message requesting a handover of at least one migrating device from the source CU to the target CU, wherein the handover request message comprises a plurality of Globally Unique Access and Mobility Management Function identifiers (GUAMIs), each of the plurality of GUAMIs being associated with a respective one of a plurality of Access and Mobility Management Functions (AMFs) serving the at least one migrating device; and based on the handover request message comprising the plurality of GUAMIs, determining whether to reconfigure an air interface of each of the at least one migrating devices.

Example Embodiment 14. The method of Embodiment 13, wherein the at least one migrating device comprises a IAB node and the handover request message indicates that the at least one migrating device is the IAB node.

Example Embodiment 15. The method of any one of Embodiments 13 to 14, wherein the at least one migrating device comprises a User Equipment (UE) and the handover request message indicates that the at least one migrating device is the UE.

Example Embodiment 16. The method of any one of Embodiments 13 to 15, wherein the at least one migrating device comprises a plurality of User Equipments (UE) and/or IAB nodes, and wherein the handover request message indicates the plurality of User Equipments (UE) and/or IAB nodes.

Example Embodiment 17. The method of any one of Embodiments 13 to 16, wherein each of plurality of AMFs are serving a cell configured for the at least one migrating device.

Example Embodiment 18. The method of any one of Embodiments 13 to 17, wherein the handover request message indicates at least one radio interface associated with the at least one migrating device that is to be reconfigured by the target CU.

Example Embodiment 19. The method of any one of Embodiments 13 to 18, wherein the handover request message indicates at least one radio interface associated with the at least one migrating device that is not to be reconfigured by the target CU.

Example Embodiment 19. The method of any one of Embodiments 13 to 18, wherein determining whether to reconfigure the air interface of each of the at least one migrating devices that are served by the plurality of AMFs associated with the plurality of GUAMIs comprises at least one of: determining to reconfigure an air interface associated a migrating device that operates as an IAB node that either directly or indirectly serves all of the at least one migrating devices; determining not to reconfigure the air interface of any of the at least one migrating devices that operate as IAB nodes that do not serve every other one of the at least one migrating devices; and/or determining not to reconfigure the air interfaces of any of the at least one migrating devices that are UEs.

Example Embodiment 20. The method of any one of Embodiments 13 to 19, wherein the handover request message comprises F1AP UE context information for each one of the at least one migrating devices and/or F1AP UE context information for any UEs served by cells configured on the at least one migrating devices.

Example Embodiment 21. The method of any one of Embodiments 13 to 20, further comprising transmitting, to each of the plurality of AMFs associated with the plurality of GUAMIs included in the handover request message, a message comprising information for performing a logical connection reconfiguration for each of the at least one migrating devices served by a respective one of the plurality of AMFs receiving the message.

Example Embodiment 22. The method of Embodiment 21, wherein the message further comprises information for performing a logical connection reconfiguration for any UEs that are served by the respective one of the plurality of AMFs receiving the message.

Example Embodiment 23. The method of any one of Embodiments 21 to 22, wherein the message comprises a PATH SWITCH REQUEST message.

Example Embodiment 24. The method of any one of Embodiments 21 to 22, wherein the message comprises a NGAP message other than a PATH SWITCH REQUEST.

Example Embodiment 25. The method of any one of Embodiments 21 to 24, further comprising receiving a response message from at least one of the plurality of AMFs, the response message comprising information associated with at least one of the migrating devices.

Example Embodiment 26. The method of Embodiment 25, wherein the response message comprises information associated with a single IAB node or a single UE associated with the at least one migrating device.

Example Embodiment 27. The method of Embodiment 26, wherein the response message comprises information for a plurality of IAB nodes or UEs associated with the at least one migrating device.

Example Embodiment 28. A computer program comprising instructions which when executed on a computer perform any of the methods of embodiments 13 to 27.

Example Embodiment 29. A computer program product comprising computer program, the computer program comprising instructions which when executed on a computer perform any of the methods of embodiments 13 to 27.

Example Embodiment 30. A non-transitory computer readable medium storing instructions which when executed by a computer perform any of the methods of embodiments 13 to 27.

Group A3 Embodiments

Example Embodiment 31. A method performed by a first network node operating as source Central Unit (CU) in an Integrated Access and Wireless Access Backhaul (IAB) network, the method comprising: transmitting, to an Access and Mobility Management Function (AMF) serving a migrating IAB node, a handover required message, wherein the handover required message comprises a plurality of Globally Unique Access and Mobility Management Function identifiers (GUAMIs), each of the plurality of GUAMIs being associated with a respective one of a plurality of Access and Mobility Management Functions (AMFs) serving the at least one migrating device.

Example Embodiment 32. The method of Embodiment 31, wherein the at least one migrating device comprises a IAB node and the handover required message indicates that the at least one migrating device is the IAB node.

Example Embodiment 33. The method of any one of Embodiments 31 to 32, wherein the at least one migrating device comprises a User Equipment (UE) and the handover required message indicates that the at least one migrating device is the UE.

Example Embodiment 34. The method of any one of Embodiments 31 to 33, wherein the at least one migrating device comprises a plurality of User Equipments (UE) and/or IAB nodes, and wherein the handover required message indicates the plurality of User Equipments (UE) and/or IAB nodes.

Example Embodiment 35. The method of any one of Embodiments 31 to 34, wherein each of plurality of AMFs are serving a cell configured for the at least one migrating device.

Example Embodiment 36. The method of any one of Embodiments 31 to 35, wherein the handover required message indicates at least one radio interface associated with the at least one migrating device that is to be reconfigured.

Example Embodiment 37. The method of any one of Embodiments 31 to 36, wherein the handover required message indicates at least one radio interface associated with the at least one migrating device that is not to be reconfigured.

Example Embodiment 38. The method of any one of Embodiments 31 to 37, wherein the handover required message indicates a radio interface associated with an IAB node that directly and indirectly serves each of the at least one migrating devices, the radio interface being indicated for reconfiguration.

Example Embodiment 39. The method of any one of Embodiments 31 to 38, wherein the handover required message comprises F1AP UE context information for each one of the at least one migrating devices and/or F1AP UE context information for any UEs served by cells configured on the at least one migrating devices.

Example Embodiment 40. A computer program comprising instructions which when executed on a computer perform any of the methods of embodiments 31 to 39.

Example Embodiment 41. A computer program product comprising computer program, the computer program comprising instructions which when executed on a computer perform any of the methods of embodiments 31 to 39.

Example Embodiment 42. A non-transitory computer readable medium storing instructions which when executed by a computer perform any of the methods of embodiments 31 to 39.

Group A4 Embodiments

43. A method performed by a first network node operating as an Access and Mobility Management Function (AMF) in an Integrated Access and Wireless Access Backhaul (IAB) network, the method comprising: receiving, from a second network node operating as a source central unit (CU) with respect to at least one migrating device, a handover required message, wherein the handover required message comprises a plurality of Globally Unique Access and Mobility Management Function identifiers (GUAMIs), each of the plurality of GUAMIs being associated with a respective one of a plurality of Access and Mobility Management Functions (AMFs) serving the at least one migrating device; and transmitting, to a target CU, a message comprising the plurality of GUAMIs associated with the AMFs serving the at least one migrating device.

Example Embodiment 44. The method of Embodiment 43, wherein the at least one migrating device comprises a IAB node and the handover required message indicates that the at least one migrating device is the IAB node.

Example Embodiment 45. The method of any one of Embodiments 43 to 44, wherein the at least one migrating device comprises a User Equipment (UE) and the handover required message indicates that the at least one migrating device is the UE.

Example Embodiment 46. The method of any one of Embodiments 43 to 45, wherein the at least one migrating device comprises a plurality of User Equipments (UE) and/or IAB nodes, and wherein the handover required message indicates the plurality of User Equipments (UE) and/or IAB nodes.

Example Embodiment 47. The method of any one of Embodiments 43 to 46, wherein each of plurality of AMFs are serving a cell configured for the at least one migrating device.

Example Embodiment 48. The method of any one of Embodiments 43 to 47, wherein the handover required message indicates at least one radio interface associated with the at least one migrating device that is to be reconfigured.

Example Embodiment 49. The method of any one of Embodiments 43 to 47, wherein the handover required message indicates at least one radio interface associated with the at least one migrating device that is not to be reconfigured.

Example Embodiment 50. The method of any one of Embodiments 43 to 49, wherein the handover required message indicates a radio interface associated with an IAB node that directly and indirectly serves each of the at least one migrating devices, the radio interface being indicated for reconfiguration.

Example Embodiment 51. The method of any one of Embodiments 43 to 50, wherein the handover required message comprises F1AP UE context information for each one of the at least one migrating devices and/or F1AP UE context information for any UEs served by cells configured on the at least one migrating devices.

Example Embodiment 52. A computer program comprising instructions which when executed on a computer perform any of the methods of embodiments 43 to 51.

Example Embodiment 53. A computer program product comprising computer program, the computer program comprising instructions which when executed on a computer perform any of the methods of embodiments 43 to 51.

Example Embodiment 54. A non-transitory computer readable medium storing instructions which when executed by a computer perform any of the methods of embodiments 43 to 51.

Group A5 Embodiments

Example Embodiment 55. A method performed by a first network node operating as target Central Unit (CU) in an Integrated Access and Wireless Access Backhaul (IAB) network, the method comprising: receiving a handover message from a second network node operating as a first Access and Mobility Management Function (AMF) serving at least one migrating device being handed over from a source CU to the target CU, the handover message comprising a plurality of Globally Unique Access and Mobility Management Function identifiers (GUAMIs), each of the plurality of GUAMIs being associated with a respective one of a plurality of Access and Mobility Management Functions (AMFs) serving the at least one migrating device, the plurality of AMFs including the first AMF; and based on the handover message comprising the plurality of GUAMIs, determining whether to reconfigure an air interface of each of the at least one migrating devices.

Example Embodiment 56. The method of Embodiment 55, wherein the at least one migrating device comprises a IAB node and the handover request message indicates that the at least one migrating device is the IAB node.

Example Embodiment 57. The method of any one of Embodiments 55 to 56, wherein the at least one migrating device comprises a User Equipment (UE) and the handover request message indicates that the at least one migrating device is the UE.

Example Embodiment 58. The method of any one of Embodiments 55 to 56, wherein the at least one migrating device comprises a plurality of User Equipments (UEs) and/or IAB nodes, and wherein the handover message indicates the plurality of UEs and/or IAB nodes.

Example Embodiment 59. The method of any one of Embodiments 55 to 56, wherein each of plurality of AMFs are serving a cell configured for the at least one migrating device.

Example Embodiment 60. The method of any one of Embodiments 55 to 59, wherein the handover message indicates at least one radio interface associated with the at least one migrating device that is to be reconfigured by the target CU.

Example Embodiment 61. The method of any one of Embodiments 55 to 60, wherein the handover message indicates at least one radio interface associated with the at least one migrating device that is not to be reconfigured by the target CU.

Example Embodiment 62. The method of any one of Embodiments 55 to 61, wherein determining whether to reconfigure the air interface of each of the at least one migrating devices that are served by the plurality of AMFs associated with the plurality of GUAMIs comprises at least one of: determining to reconfigure an air interface associated a migrating device that operates as an IAB node that either directly or indirectly serves all of the at least one migrating devices; determining not to reconfigure the air interface of any of the at least one migrating devices that operate as IAB nodes that do not serve every other one of the at least one migrating devices; and/or determining not to reconfigure the air interfaces of any of the at least one migrating devices that are UEs.

Example Embodiment 63. The method of any one of Embodiments 55 to 62, wherein the handover message comprises F1AP UE context information for each one of the at least one migrating devices and/or F1AP UE context information for any UEs served by cells configured on the at least one migrating devices.

Example Embodiment 64. The method of any one of Embodiments 55 to 63, further comprising transmitting, to each of the plurality of AMFs associated with the plurality of GUAMIs included in the handover message, a message comprising information for performing a logical connection reconfiguration for each of the at least one migrating devices served by a respective one of the plurality of AMFs receiving the message.

Example Embodiment 65. The method of Embodiment 64, wherein the message further comprises information for performing a logical connection reconfiguration for any UEs that are served by the respective one of the plurality of AMFs receiving the message.

Example Embodiment 66. The method of any one of Embodiments 64 to 65, wherein the message comprises a PATH SWITCH REQUEST message.

Example Embodiment 67. The method of any one of Embodiments 64 to 65, wherein the message comprises a NGAP message other than a PATH SWITCH REQUEST.

Example Embodiment 68. The method of any one of Embodiments 64 to 67, further comprising receiving a response message from at least one of the plurality of AMFs, the response message comprising information associated with at least one of the migrating devices.

Example Embodiment 69. The method of Embodiment 68, wherein the response message comprises information associated with a single IAB node or a single UE associated with the at least one migrating device.

Example Embodiment 70. The method of Embodiment 68, wherein the response message comprises information for a plurality of IAB nodes or UEs associated with the at least one migrating device.

Example Embodiment 71. A computer program comprising instructions which when executed on a computer perform any of the methods of embodiments 55 to 70.

Example Embodiment 72. A computer program product comprising computer program, the computer program comprising instructions which when executed on a computer perform any of the methods of embodiments 55 to 70.

Example Embodiment 73. A non-transitory computer readable medium storing instructions which when executed by a computer perform any of the methods of embodiments 55 to 70.

Group B Embodiments

Example Embodiment 74. A network node comprising: processing circuitry configured to perform any of the steps of any of the Group A1, A2, A3, A4, and A5 Embodiments; power supply circuitry configured to supply power to the wireless device.

Example Embodiment 75. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of the Group A1, A2, A3, A4, and A5 Embodiments.

Example Embodiment 76. The communication system of the pervious embodiment further including the network node.

Example Embodiment 77. The communication system of the previous 2 embodiments, further including the wireless device, wherein the wireless device is configured to communicate with the network node.

Example Embodiment 78. The communication system of the previous 3 embodiments, wherein: the processing circuitry of the host computer is configured to execute a host application, thereby providing the user data; and the wireless device comprises processing circuitry configured to execute a client application associated with the host application.

Example Embodiment 79. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps of any of the Group A1, A2, A3, A4, and A5 Embodiments.

Example Embodiment 80. The method of the previous embodiment, further comprising, at the network node, transmitting the user data.

Example Embodiment 81. The method of the previous 2 embodiments, wherein the user data is provided at the host computer by executing a host application, the method further comprising, at the wireless device, executing a client application associated with the host application.

Example Embodiment 82. A wireless device configured to communicate with a network node, the wireless device comprising a radio interface and processing circuitry configured to performs the of the previous 3 embodiments.

Example Embodiment 83. A communication system including a host computer comprising a communication interface configured to receive user data originating from a transmission from a wireless device to a network node, wherein the network node comprises a radio interface and processing circuitry, the network node's processing circuitry configured to perform any of the steps of any of the Group A1, A2, A3, A4, and A5 Embodiments.

Example Embodiment 84. The communication system of the previous embodiment further including the network node.

Example Embodiment 85. The communication system of the previous 2 embodiments, further including the wireless device, wherein the wireless device is configured to communicate with the network node.

Example Embodiment 86. The communication system of the previous 3 embodiments, wherein: the processing circuitry of the host computer is configured to execute a host application; the wireless device is configured to execute a client application associated with the host application, thereby providing the user data to be received by the host computer.

Example Embodiment 87. The method of any of the previous embodiments, wherein the network node comprises a base station.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a source Central Unit, CU, in an Integrated Access and Wireless Access Backhaul, IAB, network, the method comprising:
   transmitting a message requesting a handover of a plurality of migrating devices associated with a first IAB node migrating from the source CU to a target CU,
   wherein the message from the source CU to the target CU comprises at least one of:
      at least one Globally Unique Access and Mobility Management Function identifier, GUAMI, associated with at least one Access and Mobility Management Function, AMF, serving the plurality of migrating devices, and
      at least one Globally Unique Mobility Management Entity Identifier, GUMMEI, associated with at least one Mobility Management Entity, MME, serving the plurality of migrating devices.

2. The method of claim 1, wherein:
   the message is transmitted to the target CU and the message comprises a handover request message, or
   the message is transmitted to the at least one AMF, and the message comprises a handover required message.

3. The method of claim 1, wherein the message comprises the GUAMI associated with the at least one AMF serving the plurality of migrating devices, and wherein the at least one GUAMI is transmitted over an Xn interface.

4. The method of claim 1, wherein the message comprises the GUMMEI associated with the at least one MME serving the plurality of migrating devices, and wherein the at least one GUMMEI is transmitted over an X2 or an F1 interface.

5. The method of claim 1, wherein the message indicates whether each one of the plurality of migrating devices is a UE or an IAB.

6. The method of claim 1, wherein the message indicates:
   at least one radio interface associated with the plurality of migrating devices that is to be reconfigured by a target CU, and/or
   at least one radio interface associated with the plurality of migrating devices that is not to be reconfigured by a target CU.

7. The method of claim 1, wherein the message indicates a radio interface associated with an IAB node that directly and indirectly serves each of the plurality of migrating devices, the radio interface being indicated for reconfiguration by a target CU.

8. A method performed by a target Central Unit, CU, in an Integrated Access and Wireless Access Backhaul, IAB, network, the method comprising:
   receiving, from a source CU via an Xn interface, a first message requesting a handover of a plurality of migrating devices associated with a first IAB node from the source CU to the target CU, wherein the first message from the source CU to the target CU comprises at least one of:
      at least one Globally Unique Access and Mobility Management Function identifier, GUAMI, associated with at least one Access and Mobility Management Function, AMF, serving the plurality of migrating devices, and
      at least one Globally Unique Mobility Management Entity Identifier, GUMMEI, associated with at least one Mobility Management Entity, MME, serving the plurality of migrating devices; and
   transmitting, to at least one of the AMF associated with the GUAMI and the MME associated with the GUMMEI, a second message comprising information for performing a logical connection reconfiguration for each of the plurality of migrating devices.

9. The method of claim 8, wherein the first message comprises the GUAMI associated with the at least one AMF serving the plurality of migrating devices, and wherein the at least one GUAMI is transmitted in the second message over the Xn interface.

10. The method of claim 9, wherein the first message comprises the GUMMEI associated with the at least one MME serving the plurality of migrating devices, and wherein the at least one GUMMEI is transmitted in the second message over an X2 or an F1 interface.

11. The method of claim 8, wherein at least one of the first message and the second message indicates whether each one of the plurality of migrating devices is a UE or an IAB node.

12. The method of claim 8, wherein at least one of the first message and the second message indicate:
    at least one radio interface associated with the plurality of migrating devices that is to be reconfigured by the target CU, and/or
    at least one radio interface associated with the plurality of migrating devices that is not to be reconfigured by the target CU.

13. The method of claim 8, further comprising, based on the first message, performing at least one of:
    determining to reconfigure an air interface associated with a migrating device that operates as an IAB node that either directly or indirectly serves all of the plurality of migrating devices;
    determining not to reconfigure an air interface of any of the plurality of migrating devices that operate as an IAB node that does not serve every other one of the at least one migrating devices; and
    determining not to reconfigure an air interface of any of the plurality of migrating devices that are UEs.

14. The method of claim 8, wherein the first message comprises F1AP UE context information for each one of the plurality of migrating devices and/or F1AP UE context information for any UEs served by cells configured on the plurality of migrating devices.

15. The method of claim 8, wherein the second message further comprises information for performing a logical connection reconfiguration for any UEs that are served by the at least one management function receiving the second message.

16. A source Central Unit, CU, in an Integrated Access and Wireless Access Backhaul, IAB, network, the source CU adapted to:
    transmit a message requesting a handover of a plurality of migrating devices associated with a first IAB node migrating from the source CU to a target CU, wherein the message from the source CU to the target CU comprises at least one of:
- at least one Globally Unique Access and Mobility Management Function identifier, GUAMI, associated with at least one Access and Mobility Management Function, AMF, serving the plurality of migrating devices, and
- at least one Globally Unique Mobility Management Entity Identifier, GUMMEI, associated with at least one Mobility Management Entity, MME, serving the plurality of migrating devices.

17. The source CU of claim 16, wherein the source CU is adapted to:
transmit the message to the target CU and the message comprises a handover request message, or
transmit the message to the at least one AMF and the message comprises a handover required message.

18. A target Central Unit, CU, in an Integrated Access and Wireless Access Backhaul, IAB, network, the target CU adapted to:
receive, from a source CU via an Xn interface, a first message requesting a handover of a plurality of migrating devices associated with a first IAB node from the source CU to the target CU, wherein the first message from the source CU to the target CU comprises at least one of:
- at least one Globally Unique Access and Mobility Management Function identifier, GUAMI, associated with at least one Access and Mobility Management Function, AMF, serving the plurality of migrating devices, and
- at least one Globally Unique Mobility Management Entity Identifier, GUMMEI, associated with at least one Mobility Management Entity, MME, serving the plurality of migrating devices; and transmit, to at least one of the AMF associated with the GUAMI and the MME associated with the GUMMEI, a second message comprising information for performing a logical connection reconfiguration for each of the plurality of migrating devices.

19. The target CU of claim 18, wherein the first message comprises the GUAMI associated with the at least one AMF serving the plurality of migrating devices, and wherein the at least one GUAMI is transmitted in the second message over the Xn interface.

* * * * *